(12) United States Patent
Lee et al.

(10) Patent No.: US 11,991,000 B2
(45) Date of Patent: May 21, 2024

(54) METHOD AND DEVICE FOR TRANSMITTING PREEMPTIVE MESSAGE RELATED TO SIDELINK COMMUNICATION IN NR V2X

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 551 days.

(21) Appl. No.: 17/280,844

(22) PCT Filed: Sep. 30, 2019

(86) PCT No.: PCT/KR2019/012771
§ 371 (c)(1),
(2) Date: Mar. 26, 2021

(87) PCT Pub. No.: WO2020/067846
PCT Pub. Date: Apr. 2, 2020

(65) Prior Publication Data
US 2022/0006569 A1    Jan. 6, 2022

Related U.S. Application Data

(60) Provisional application No. 62/737,953, filed on Sep. 28, 2018.

(51) Int. Cl.
*H04L 1/18* (2023.01)
*H04L 1/1812* (2023.01)
(Continued)

(52) U.S. Cl.
CPC ........... *H04L 1/1812* (2013.01); *H04W 72/20* (2023.01); *H04W 72/56* (2023.01); *H04W 72/0453* (2013.01)

(58) Field of Classification Search
CPC .... H04L 1/1812; H04W 72/56; H04W 72/20; H04W 72/0453; H04W 72/0406
See application file for complete search history.

(56) References Cited

U.S. PATENT DOCUMENTS

2020/0037343 A1*  1/2020  He ............... H04W 28/0268
2020/0099476 A1*  3/2020  Park ..................... H04W 4/70
(Continued)

FOREIGN PATENT DOCUMENTS

WO        2018043960        3/2018

OTHER PUBLICATIONS

PCT International Application No. PCT/KR2019/012771, International Search Report dated Jan. 6, 2020, 4 pages.
(Continued)

*Primary Examiner* — Derrick V Rose
(74) *Attorney, Agent, or Firm* — LEE, HONG, DEGERMAN, KANG & WAIMEY

(57) ABSTRACT

An operating method of a first device (100) in a wireless communication system and a device for supporting same are provided. The method can comprise a step of transmitting, on a hybrid automatic repeat request (HARQ) feedback resource, a preemptive message to a second device (200). The preemptive message can comprise information related to the transmission of first sidelink information by the first device (100).

14 Claims, 33 Drawing Sheets

(51) Int. Cl.
*H04W 72/04* (2023.01)
*H04W 72/10* (2009.01)
*H04W 72/20* (2023.01)
*H04W 72/56* (2023.01)
*H04W 72/0453* (2023.01)

(56) References Cited

U.S. PATENT DOCUMENTS

2021/0219320 A1\* 7/2021 Belleschi .............. H04W 72/20
2021/0352597 A1\* 11/2021 Do .................... H04W 72/0446
2021/0377912 A1\* 12/2021 El Hamss ............. H04L 1/1854

OTHER PUBLICATIONS

Intel Corporation, "Scheduling assignment for sidelink V2V communication," 3GPP TSG RAN WG1 Meeting #86, R1-166516, Aug. 2016, 10 pages.

Intel Corporation, "Support of Sidelink Unicast, Groupcast and Broadcast Modes for NR V2X Communication," 3GPP TSG RAN WG1 Meeting #94, R1-1808693, Aug. 2018, 7 pages.

Intel Corporation, "Sidelink Resource Allocation Mechanisms for NR V2X Communication," 3GPP TSG RAN WG1 Meeting #94, R1-1808696, Aug. 2018, 13 pages.

InterDigital Inc., "NR Sidelink Physical Layer Structures and Procedures," 3GPP TSG RAN WG1 Meeting #94, R1-1809094, Aug. 2018, 5 pages.

\* cited by examiner

FIG. 9
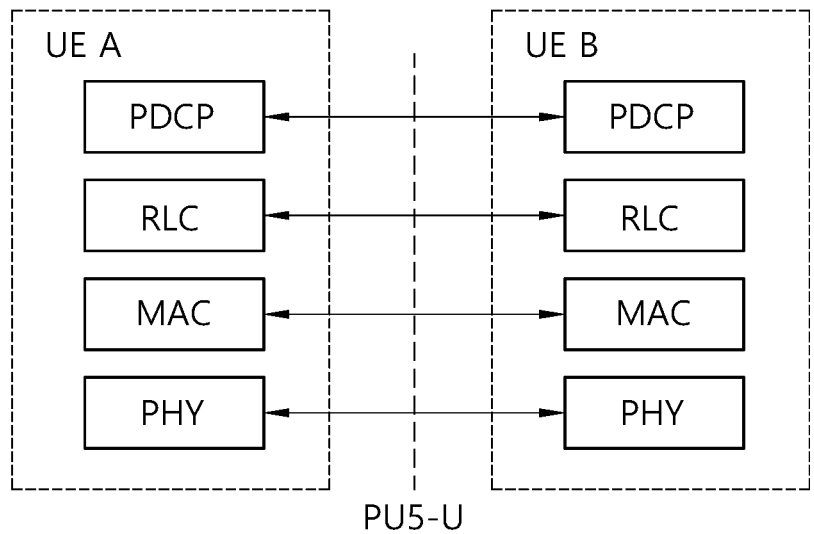
(a)
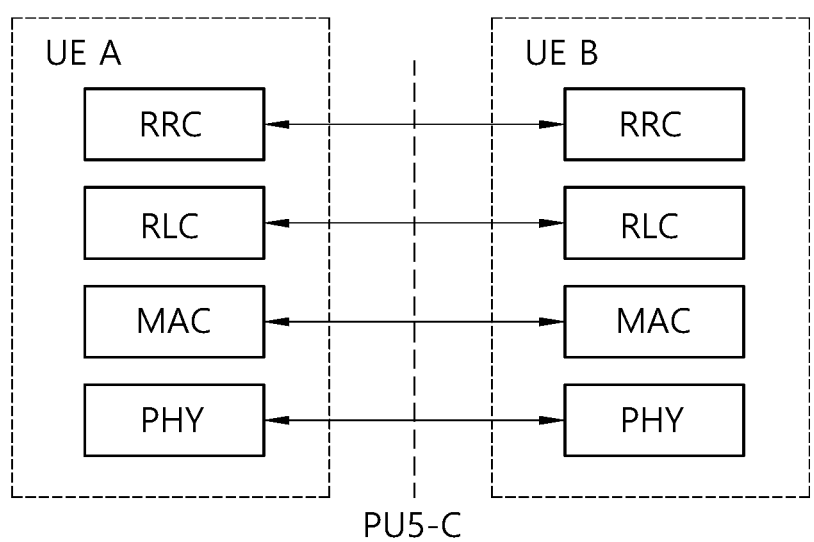
(b)

FIG. 10
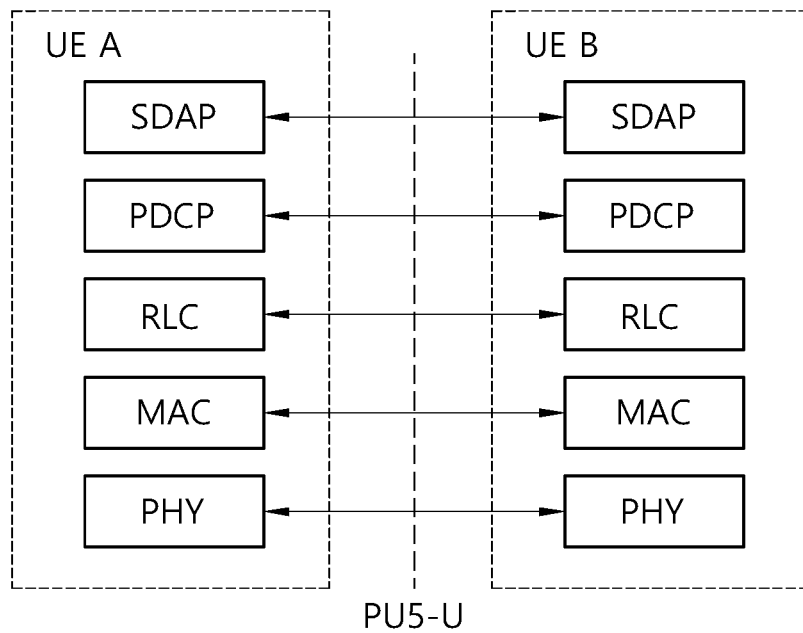
(a)
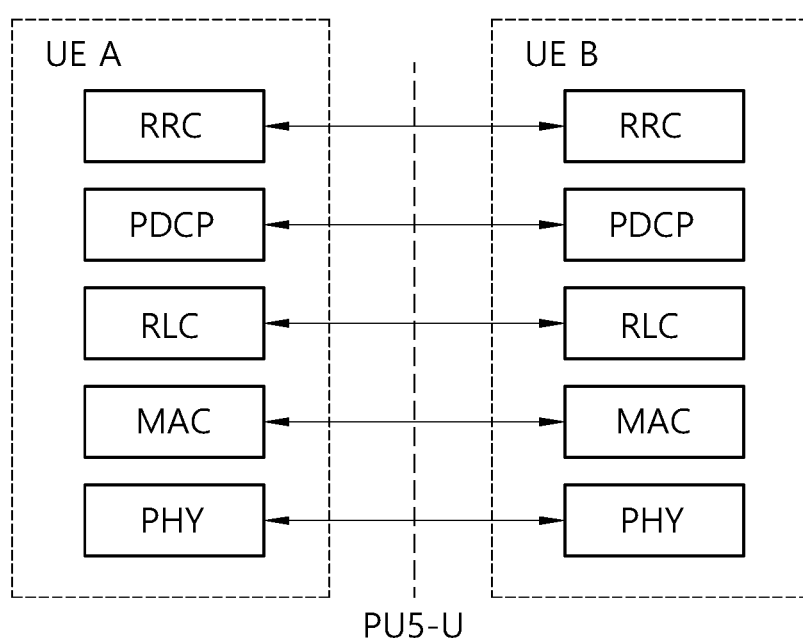
(b)

METHOD AND DEVICE FOR TRANSMITTING PREEMPTIVE MESSAGE RELATED TO SIDELINK COMMUNICATION IN NR V2X

CROSS-REFERENCE TO RELATED APPLICATIONS

This application is the National Stage filing under 35 U.S.C. 371 of International Application No. PCT/KR2019/012771, filed on Sep. 30, 2019, which claims the benefit of U.S. Provisional Application No. 62/737,953 filed on Sep. 28, 2018, the contents of which are all hereby incorporated by reference herein in their entirety.

BACKGROUND

Field

This disclosure relates to a wireless communication system.

Related Art

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

Meanwhile, in the case of NR sidelink or NR V2X, a user equipment (UE) needs to transmit information related to transmission of sidelink data and/or control information having a relatively high priority to other UEs. Accordingly, there is a need for a method of transmitting a pre-emption message for notifying other UEs information related to transmission of sidelink data and/or control information having a relatively high priority on pre-determined resources.

In an embodiment, there is provided a method of performing wireless communication by a first apparatus. The method may include transmitting a pre-emption message to a second apparatus on hybrid automatic repeat request (HARQ) feedback resources from the second apparatus. For example, the pre-emption message may include information related to transmission of the first sidelink information by the first apparatus.

In another embodiment, there is provided a method of performing wireless communication by a second apparatus. The method may include receiving a pre-emption message from a first apparatus on hybrid automatic repeat request (HARQ) feedback resources, and determining whether to reselect all or part of resources reserved by the second apparatus based on the pre-emption message. For example, the pre-emption message may include information related to transmission of the first sidelink information by the first apparatus.

A UE may effectively perform sidelink communication.

BRIEF DESCRIPTION OF THE DRAWINGS

FIG. 9 shows a UE performing V2X or SL communication, in accordance with an embodiment of the present disclosure.

FIG. 10 shows a procedure of performing V2X or SL communication by a UE based on a transmission mode, in accordance with an embodiment of the present disclosure.

DESCRIPTION OF EXEMPLARY EMBODIMENTS

In various embodiments of the present disclosure, it shall be interpreted that "/" and "," indicate "and/or". For example, "A/B" may mean "A and/or B". Additionally, "A, B" may also mean "A and/or B". Moreover, "AB/C" may mean "at least any one of A, B and/or C". Furthermore, "A, B, C" may also mean "at least any one of A, B and/or C".

In various embodiments of the present disclosure, it shall be interpreted that "or" indicates "and/or". For example, "A or B" may include "only A", "only B", and/or "both A and B". In other words, it shall be interpreted that "or" indicates "additionally or alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 1:
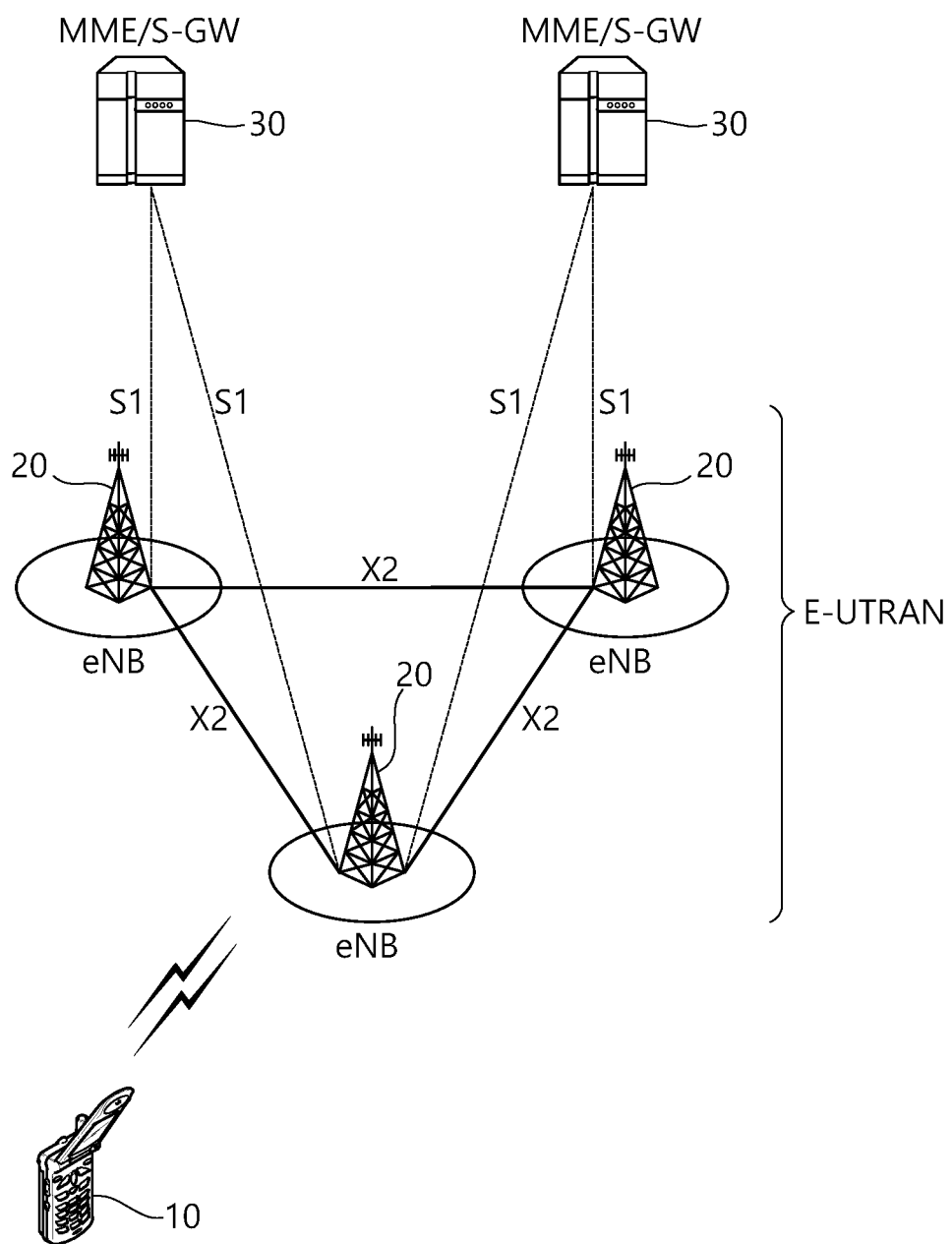
FIG. 1 is a drawing for describing V2X communication based on NR, compared to V2X communication based on RAT used before NR.

FIG. 1 shows a structure of an LTE system, in accordance with an embodiment of the present disclosure. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) 20, which provides a control plane and a user plane to a user equipment (UE) 10. The UE 10 may be fixed or mobile and may also be referred to by using different terms, such as Mobile Station (MS), User Terminal (UT), Subscriber Station (SS), Mobile Terminal (MT), wireless device, and so on. The base station 20 refers to a fixed station that communicated with the UE 10 and may also be referred to by using different terms, such as evolved-NodeB (eNB), Base Transceiver System (BTS), Access Point (AP), and so on.

The base stations 20 are interconnected to one another through an 23 interface. The base stations 20 are connected to an Evolved Packet Core (EPC) 30 through an S1 interface. More specifically, the base station 20 are connected to a Mobility Management Entity (MME) through an S1-MME interface and connected to Serving Gateway (S-GW) through an S1-U interface.

The EPC 30 is configured of an MME, an S-GW, and a Packet Data Network-Gateway (P-GW). The MME has UE access information or UE capability information, and such information may be primarily used in UE mobility management. The S-GW corresponds to a gateway having an E-UTRAN as its endpoint. And, the P-GW corresponds to a gateway having a Packet Data Network (PDN) as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
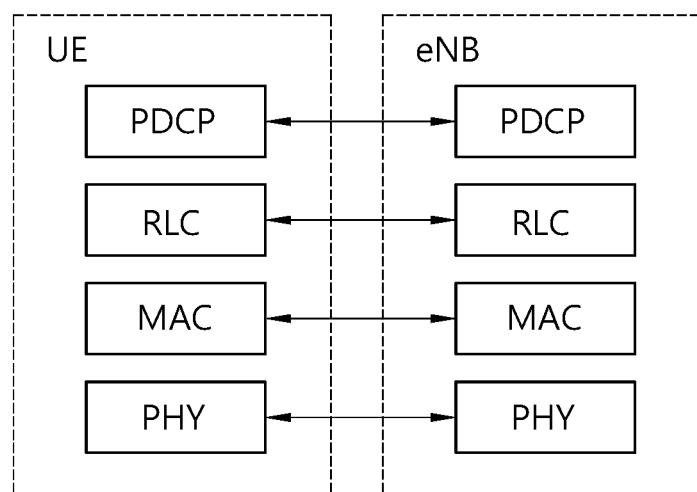
FIG. 2 shows a structure of an NR system, in accordance with an embodiment of the present disclosure.
Figure 3:
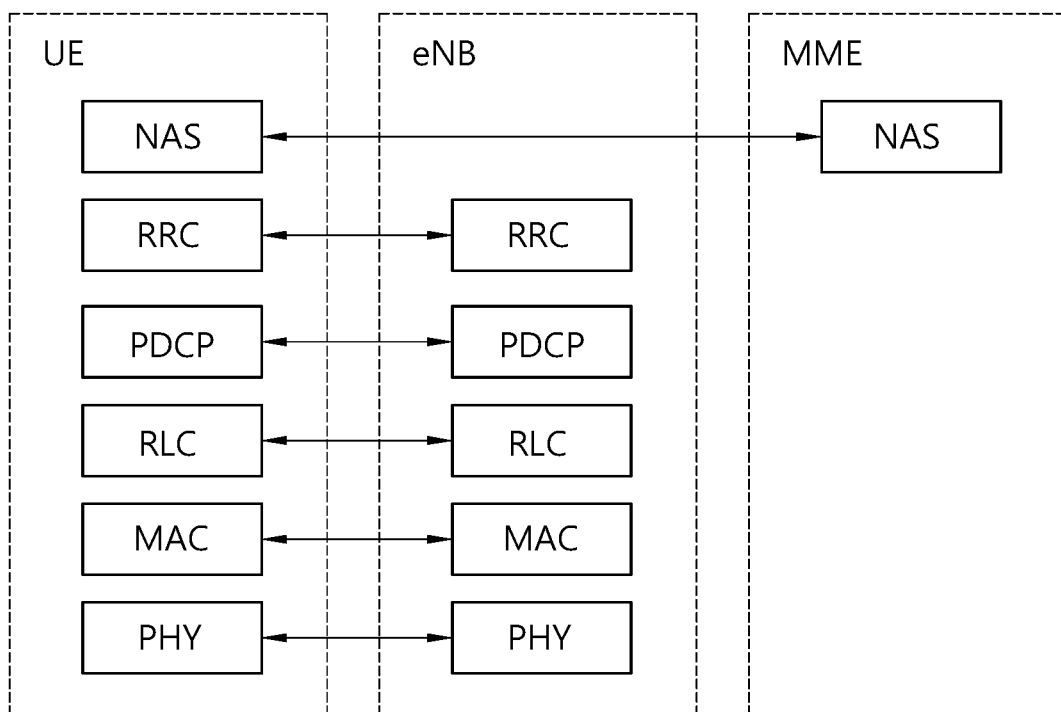
FIG. 3 shows a functional division between an NG-RAN and a 5GC, in accordance with an embodiment of the present disclosure.

FIG. 2 shows a radio protocol architecture of a user plane, in accordance with an embodiment of the present disclosure. FIG. 3 shows a radio protocol architecture of a control plane, in accordance with an embodiment of the present disclosure. The user plane corresponds to a protocol stack for user data transmission, and the control plane corresponds to a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (physical layer or PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data. Functions of a PDCP layer in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 4:
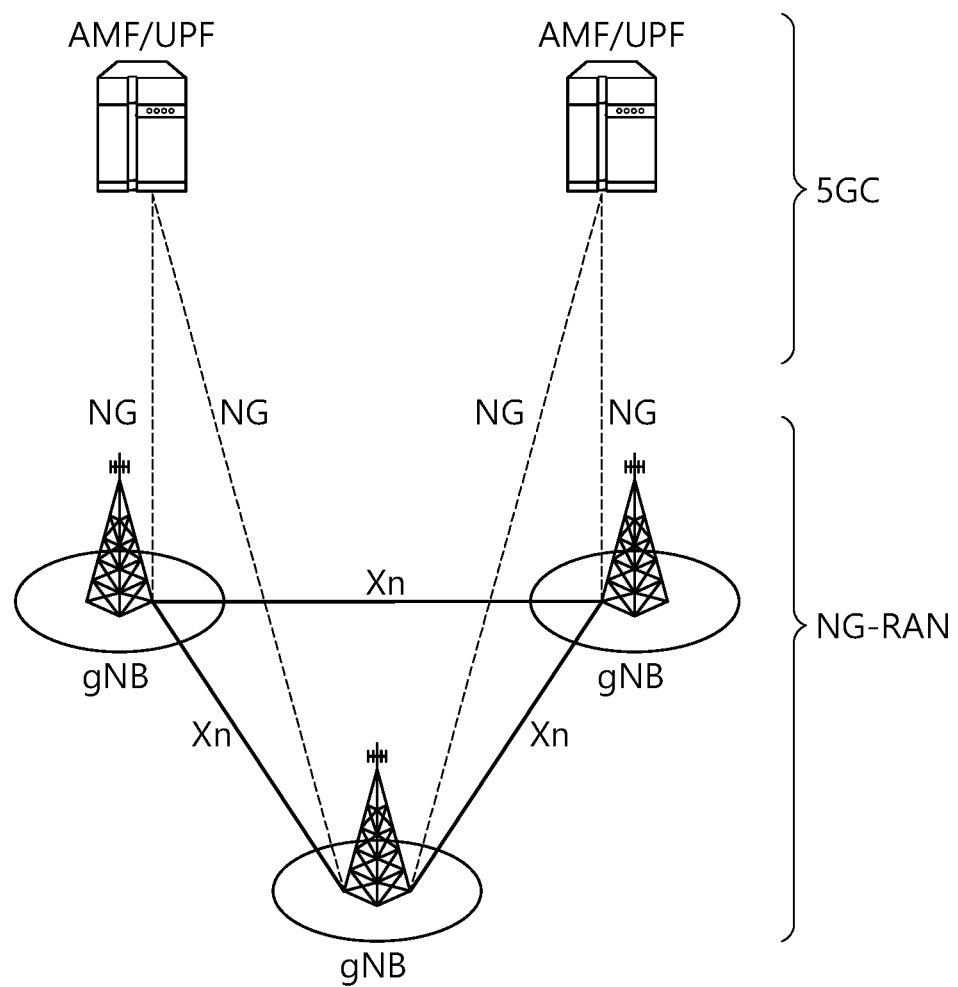
FIG. 4 shows a radio protocol architecture, in accordance with an embodiment of the present disclosure.

FIG. 4 shows a structure of an NR system, in accordance with an embodiment of the present disclosure.

Referring to FIG. 4, a Next Generation-Radio Access Network (NG-RAN) may include a next generation-Node B (gNB) and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
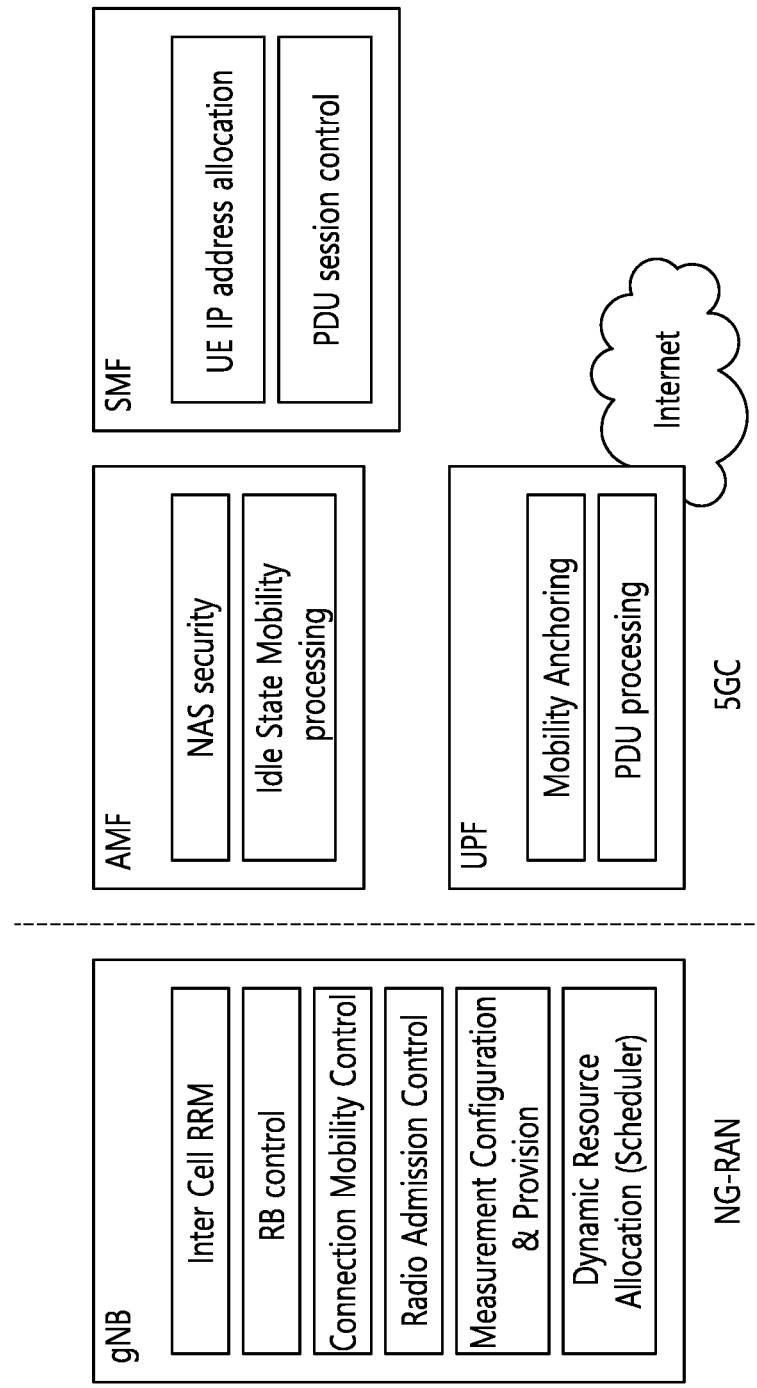
FIG. 5 shows a structure of an NR system, in accordance with an embodiment of the present disclosure.

FIG. 5 shows a functional division between an NG-RAN and a 5GC, in accordance with an embodiment of the present disclosure.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 6:
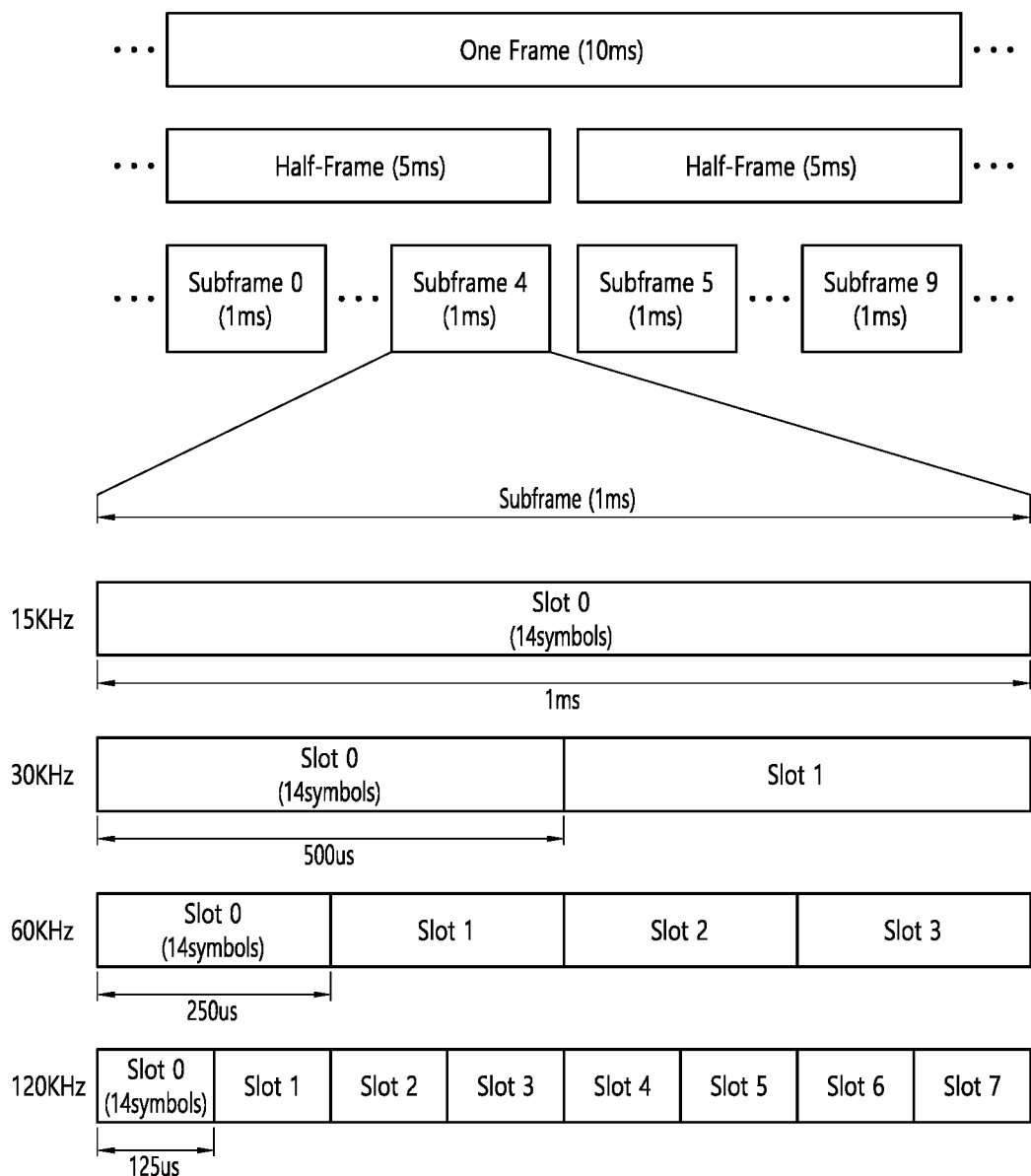
FIG. 6 shows a structure of a slot of an NR frame, in accordance with an embodiment of the present disclosure.

FIG. 6 shows a structure of a radio frame of an NR, in accordance with an embodiment of the present disclosure.

Referring to FIG. 6, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table A1 shown below represents an example of a number of symbols per slot (Nslotsymb), a number slots per frame (Nframe, uslot), and a number of slots per subframe (Nsubframe, uslot) in accordance with an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
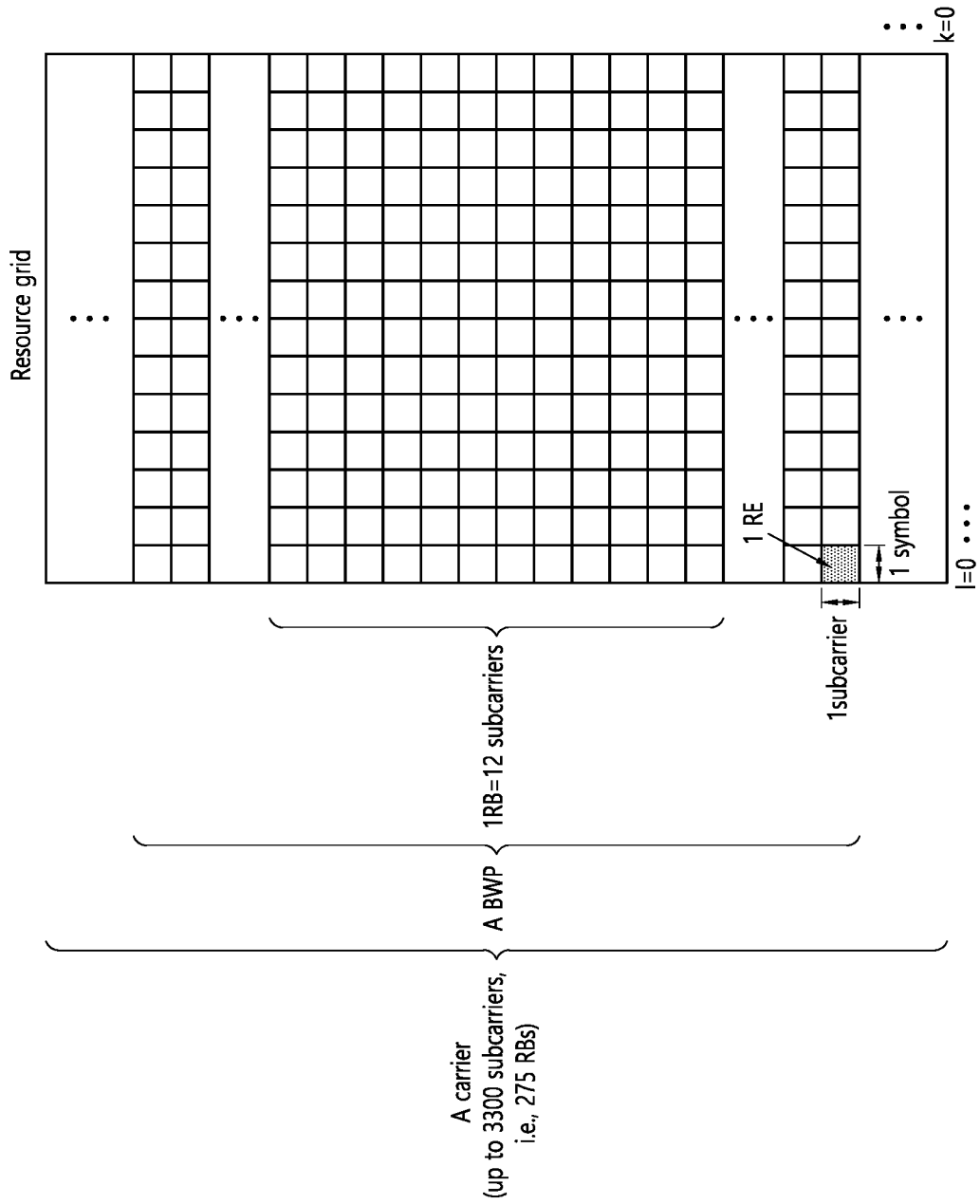
FIG. 7 shows an example of a BWP, in accordance with an embodiment of the present disclosure.

FIG. 7 shows a structure of a slot of an NR frame, in accordance with an embodiment of the present disclosure. Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the location of the bandwidth may move in a frequency domain. For example, the location of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be referred to as a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 8:
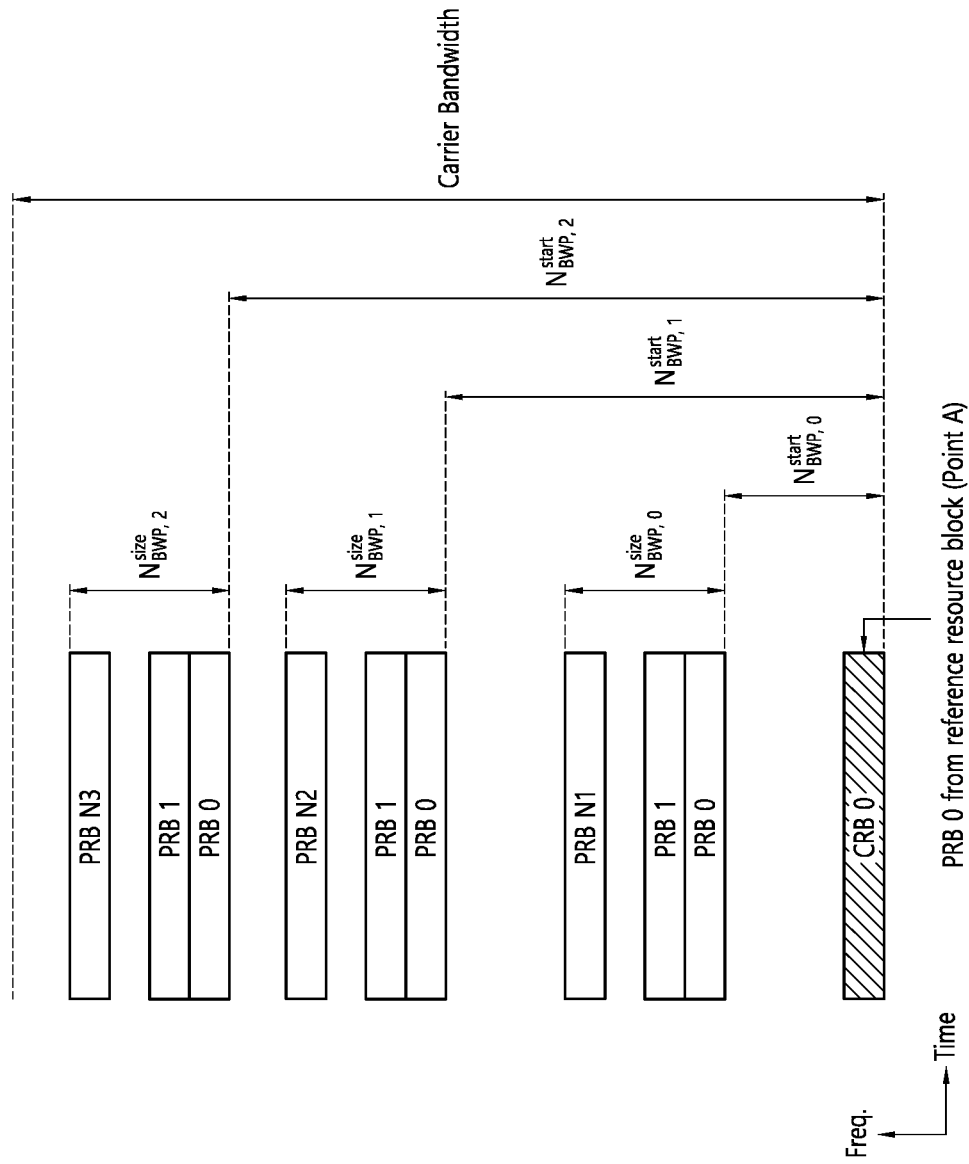
FIG. 8 shows a radio protocol architecture for a SL communication, in accordance with an embodiment of the present disclosure.

FIG. 8 shows a BWP based on an embodiment of the present disclosure. It is assumed in the embodiment of FIG. 8 that the number of BWPs is 3.

Referring to FIG. 8, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A, and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 9 shows a radio protocol architecture for a SL communication, in accordance with an embodiment of the present disclosure. The embodiment of FIG. 9 may be combined with various embodiments of the present disclosure. More specifically, (a) of FIG. 9 shows a user plane protocol stack of LTE, and (b) of FIG. 9 shows a control plane protocol stack of LTE.

FIG. 10 shows a radio protocol architecture for a SL communication, in accordance with an embodiment of the present disclosure. The embodiment of FIG. 10 may be combined with various embodiments of the present disclosure. More specifically, (a) of FIG. 10 shows a user plane protocol stack of NR, and (b) of FIG. 10 shows a control plane protocol stack of NR.

Hereinafter, a Sidelink Synchronization Signal (SLSS) and synchronization information will be described in detail.

The SLSS is a sidelink specific sequence, which may include a Primary Sidelink Synchronization Signal (PSSS) and a Secondary Sidelink Synchronization Signal (SSSS). The PSSS may be referred to as Sidelink Primary Synchronization Signal (S-PSS) and the SSSS may be referred to as Sidelink Secondary Synchronization Signal (S-SSS).

A Physical Sidelink Broadcast Channel (PSBCH) may refer to a (broadcast) channel through which (system) information, which consist of default (or basic) information that should first be known by the UE before the sidelink signal transmission/reception. For example, the default (or basic) information may be information related to the SLSS, a Duplex Mode (DM), TDD UL/DL configuration, information related to resource pools, types of applications related to the SLSS, a subframe offset, broadcast information, and so on.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. In addition, a frequency position of the S-SSB may be (pre-)configured. Accordingly, the UE does not need to perform hypothesis detection at frequency to discover the S-SSB in the carrier.

Each SLSS may have a physical layer sidelink synchronization identity (ID), and the values may be respectively equal to any one value ranging from 0 to 335. Depending upon any one of the above-described values that is used, a synchronization source may also be identified. For example, values of 0, 168, 169 may indicate the GNSS, values from 1 to 167 may indicate base stations, and values from 170 to 335 may indicate that the source is outside of the coverage. Alternatively, among the physical layer sidelink synchronization ID values, values 0 to 167 may be values being used by a network, and values from 168 to 335 may be values being used outside of the network coverage.

Figure 11:
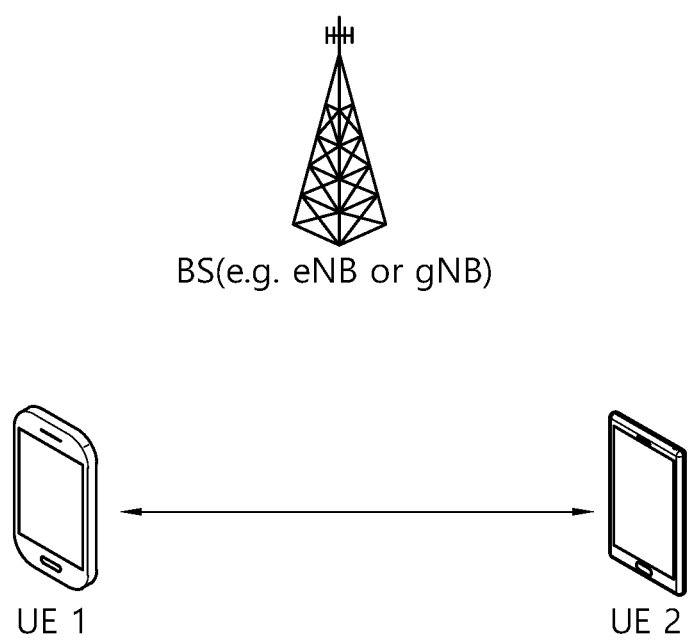
FIG. 11 shows three cast types, in accordance with an embodiment of the present disclosure.

FIG. 11 shows a UE performing V2X or SL communication in accordance with an embodiment of the present disclosure.

Referring to FIG. 11, in V2X or SL communication, the term 'UE' may generally imply a UE of a user. However, if a network equipment such as a BS transmits/receives a signal based on a communication scheme between UEs, the BS may also be regarded as a sort of the UE.

For example, the UE 1 may select a resource unit corresponding to a specific resource in a resource pool which implies a set of series of resources. In addition, the UE 1 may transmit an SL signal by using the resource unit. For example, the UE 2 which is a receiving UE may be allocated with a resource pool in which the UE 1 is capable of transmitting a signal, and may detect a signal of the UE 1 in the resource pool.

Herein, if the UE 1 is within a coverage of the BS, the BS may inform the UE 1 of the resource pool. Otherwise, if the UE 1 is out of the coverage of the BS, another UE may inform the UE 1 of the resource pool, or the UE 1 may use a pre-configured resource pool.

In general, the resource pool may be configured based on a plurality of resource units, and each UE may select at least one resource unit for SL signal transmission.

Figure 12:
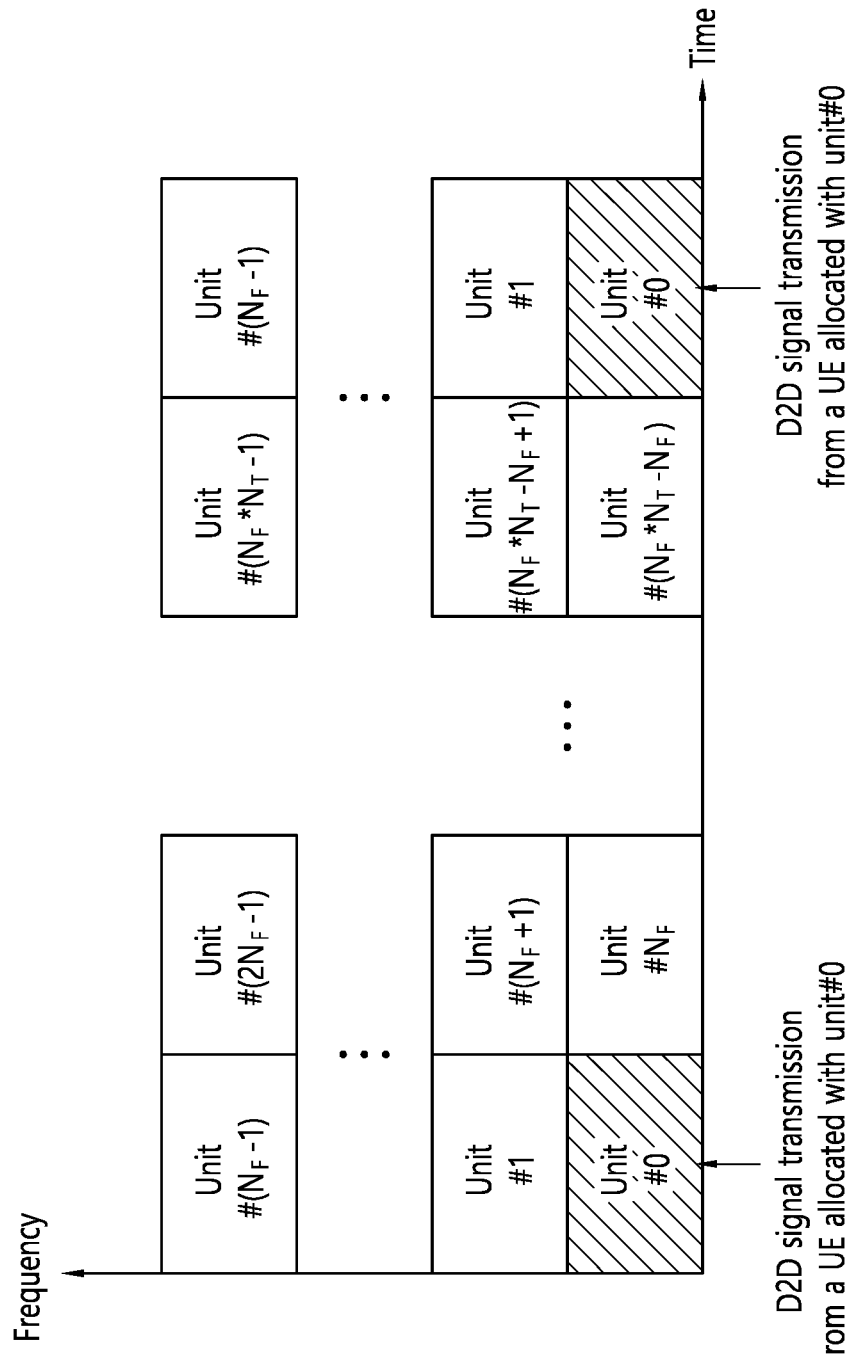
FIG. 12 shows a procedure of performing sidelink communication, based on downlink control information (DCI) received by a UE from a BS, according to an embodiment of the present disclosure.

FIG. 12 shows a resource unit for V2X or SL communication based on an embodiment of the present disclosure.

Referring to FIG. 12, all frequency resources of a resource pool may be divided into NF resources, and all time resources of the resource pool may be divided into NT resources. Therefore, NF*NT resource units may be defined in the resource pool. FIG. A12 may show an example of a case where a corresponding resource pool is repeated with a period of NT subframes.

As shown in FIG. 12, one resource unit (e.g., Unit #0) may be periodically repeated. Alternatively, to obtain a diversity effect in a time or frequency domain, an index of a physical resource unit to which one logical resource unit is mapped may change to a pre-determined pattern over time. In a structure of such a resource unit, the resource pool may imply a set of resource units that can be used in transmission by a UE intending to transmit an SL signal.

The resource pool may be subdivided into several types. For example, based on content of an SL signal transmitted in each resource pool, the resource pool may be classified as follows.

(1) Scheduling assignment (SA) may be a signal including information related to a location of a resource used for transmission of an SL data channel by a transmitting UE, a modulation and coding scheme (MCS) or multiple input multiple output (MIMO) transmission scheme required for demodulation of other data channels, timing advance (TA), or the like. The SA can be transmitted by being multiplexed together with SL data on the same resource unit. In this case, an SA resource pool may imply a resource pool in which SA is transmitted by being multiplexed with SL data. The SA may also be referred to as an SL control channel.

(2) An SL data channel (physical sidelink shared channel (PSSCH)) may be a resource pool used by the transmitting UE to transmit user data. If SA is transmitted by being multiplexed together with SL data on the same resource unit, only an SL data channel of a type except for SA information may be transmitted in the resource pool for the SL data channel. In other words, resource elements (REs) used to transmit SA information on an individual resource unit in the SA resource pool may be used to transmit SL data still in the resource pool of the SL data channel. For example, the transmitting UE may transmit the PSSCH by mapping it to consecutive PRBs.

(3) A discovery channel may be a resource pool for transmitting, by the transmitting UE, information related to an ID thereof, or the like. Accordingly, the transmitting UE may allow an adjacent UE to discover the transmitting UE itself.

Even if the aforementioned SL signals have the same content, different resource pools may be used based on a transmission/reception attribute of the SL signals. For example, even the same SL data channel or discovery message may be classified again into different resource pools based on a scheme of determining SL signal transmission timing (e.g., whether it is transmitted at a reception time of a synchronization reference signal or transmitted by applying a specific timing advance at the reception time), a resource allocation scheme (e.g., whether a BS designates a transmission resource of an individual signal to an individual transmitting UE or whether the individual transmitting UE autonomously selects an individual signal transmission resource in a resource pool), a signal format (e.g., the number of symbols occupied by each SL signal or the number of subframes used in transmission of one SL signal), signal strength from the BS, transmit power strength of an SL UE, or the like.

Hereinafter, a resource allocation in sidelink will be described.

Figure 13:
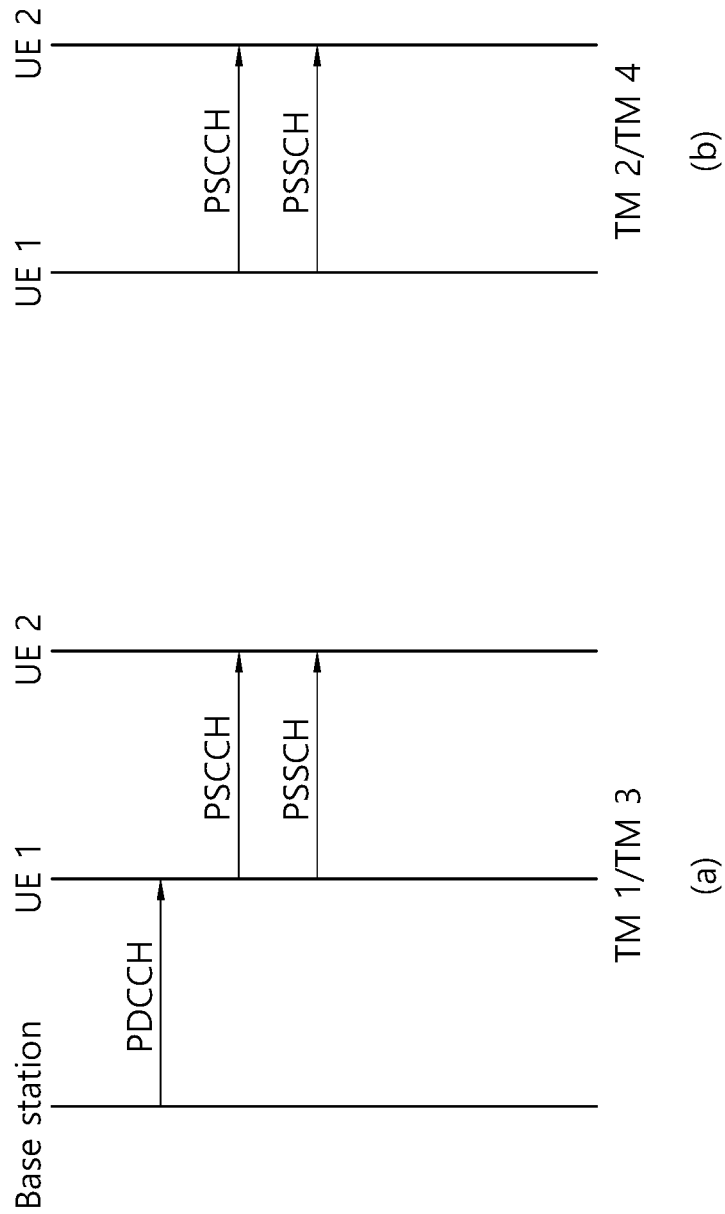
FIG. 13 shows a method of receiving control information by a first apparatus 100 from a BS according to an embodiment of the present disclosure.

FIG. 13 shows exemplary UE operations according to a transmission mode (TM) related to V2X/D2D in accordance with an embodiment of the present disclosure. More specifically, (a) of FIG. 13 shows UE operations related to Transmission mode 1 or Transmission mode 3, and (b) of FIG. 13 shows UE operations related to Transmission mode 2 or Transmission mode 4.

Referring to (a) of FIG. 13, in Transmission modes 1/3, the base station performs resource scheduling to UE 1 through a PDCCH (more specifically, DCI), and UE 1 performs sidelink/V2X communication with UE 2 in accordance with the corresponding resource scheduling. After transmitting sidelink control information (SCI) to UE 2 through a physical sidelink control channel (PSCCH), UE 1 may transmit data that is based on the SCI through a physical sidelink shared channel (PSSCH). Transmission mode 1 may be applied to sidelink, and Transmission mode 3 may be applied to V2X.

Referring to (b) of FIG. 13, in Transmission modes 2/4 may be modes according to which the UE performs self-scheduling. More specifically, Transmission mode 2 may be applied to sidelink, wherein the UE may select a resource by itself from a configured resource pool and perform sidelink operations. Transmission mode 4 may be applied to V2X, wherein, after performing sensing/SA decoding processes, and so on, the UE may select a resource by itself from a selection window and may then perform V2X operations. After transmitting SCI to UE 2, UE 1 may transmit data that is based on the SCI through the PSSCH. Hereinafter, the term Transmission mode may be abbreviated as Mode.

In case of NR sidelink, at least two types of sidelink resource allocation modes may be defined. In case of Mode 1, the base station may schedule sidelink resources that are to be used for sidelink transmission. In case of Mode 2, the user equipment (UE) may determine a sidelink transmission resource from sidelink resources that are configured by the base station/network or predetermined sidelink resources. The configured sidelink resources or the predetermined sidelink resources may be a resource pool. For example, in case of Mode 2, the UE may autonomously select a sidelink resource for transmission. For example, in case of Mode 2, the UE may assist (or help) sidelink resource selection of another UE. For example, in case of Mode 2, the UE may be configured with an NR configured grant for sidelink transmission. For example, in case of Mode 2, the UE may schedule sidelink transmission of another UE. And, Mode 2 may at least support reservation of sidelink resources for blind retransmission.

Procedures related to sensing and resource (re-)selection may be supported in Resource Allocation Mode 2. The sensing procedure may be defined as a process decoding the SCI from another UE and/or sidelink measurement. The decoding of the SCI in the sensing procedure may at least provide information on a sidelink resource that is being indicated by a UE transmitting the SCI. When the corresponding SCI is decoded, the sensing procedure may use L1 SL Reference Signal Received Power (RSRP) measurement, which is based on a Demodulation Reference Signal (SL DMRS). The resource (re-)selection procedure may use a result of the sensing procedure in order to determine the resource for the sidelink transmission.

Figure 14:
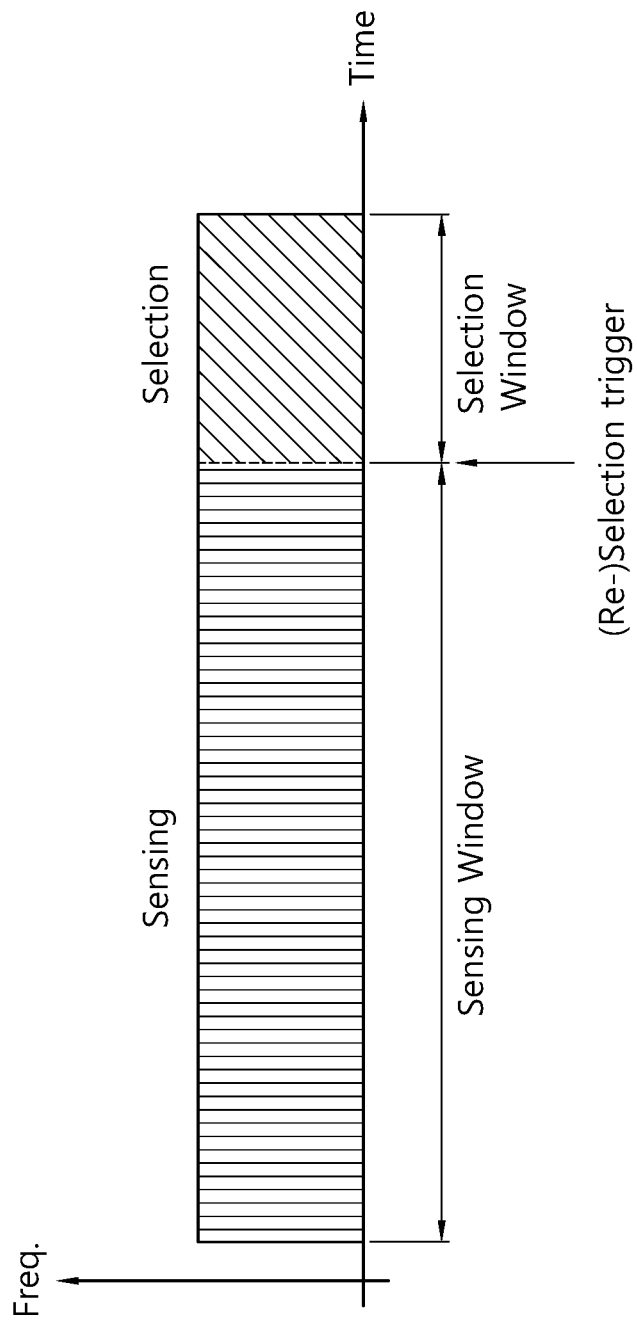
FIG. 14 shows a method of transmitting control information by a BS to a first apparatus 100 according to an embodiment of the present disclosure.

FIG. 14 shows an example of a selection of transmission resources in accordance with an embodiment of the present disclosure.

Referring to FIG. 14, by performing sensing within a sensing window, the UE may determine transmission resources reserved by another UE or transmission resources being used by another UE, and, after such transmission resources are excluded from the selection window, among the remaining resources, the UE may randomly select resources from resources having little interference.

For example, within the sensing window, the UE may decode the PSCCH including information on the cycle periods (or terms) of the reserved resources and may measure PSCCH RSRP from the periodically determined resources based on the PSCCH. The UE may exclude resources having the PSSCH RSRP that exceeds a threshold value from the selection window. Thereafter, the UE may randomly select sidelink resources from the remaining resources within the selection window.

Alternatively, the UE may measure Received signal strength indication (RSSI) of the periodic resources within the sensing window, so as to determine resources having little interference (e.g., resources corresponding to the lower 20%). And, among the periodic resources, the UE may randomly select sidelink resources from the resources included in the selection window. For example, in case the UE fails to perform decoding of the PSCCH, the UE may use the above-described method.

Meanwhile, in a wireless communication system, the UE may transmit pre-emption message to other UEs so that resources related to sidelink data and/or control information to be transmitted do not overlap with resources to be used by other UEs.

When the UE transmits a message related to a service with higher priority (e.g., a message with a higher Prose Per-Packet Reliability (PPPR) value, a message with a lower Prose Per Packet Priority (PPPP) value, or a message with a smaller latency budget), the UE may signal other UEs a pre-emption message containing resource information related to the transmission of the message, priority information related to the transmission of the message, etc. through a predefined channel (e.g., PSCCH or PSSCH). For example, among other UEs that have received the preemption message, in the case of the UE that transmits a message with a lower priority than the priority information in the preemption message, if the resources in the preemption message and its resources overlap, the UE may trigger the re-selection of resources and re-select non-overlapping resources. For example, among other UEs that have received the preemption message, in the case of the UE that transmits a message with a relatively lower priority than the priority information in the preemption message, if the resources in the preemption message and its resources partially overlap, the UE may trigger the re-selection of resources and re-select non-overlapping resources. Accordingly, the UE may effectively protect the transmission of a message of a relatively high priority.

According to the method described below, the UE may transmit a preemption message to other UEs in order to protect sidelink data and/or control information with high priority.

According to various embodiments of the present disclosure, at least one proposed method may be applied to at least one of unicast communication, groupcast communication, and/or broadcast communication.

According to various embodiments of the present disclosure, at least one proposed method may be applied not only to sidelink communication or V2X communication based on PC5 interface or SL interface (e.g., PSCCH, PSSCH, PSBCH, PSSS/SSSS, etc.), but also to sidelink communication or V2X communication based on Uu interface (e.g., PUSCH, PDSCH, PDCCH, PUCCH, etc.).

In various embodiments of the present disclosure, reception of the UE may include decoding and/or reception of a sidelink channel and/or a sidelink signal (e.g., PSCCH, PSSCH, PSFCH, PSBCH, PSSS/SSSS, etc.). Reception of the UE may include decoding and/or reception of a WAN DL channel and/or a WAN DL signal (e.g., PDSCH, PDCCH, PSS/SSS, etc.). Reception of the UE may include may include sensing and/or CBR measurement. In various embodiments of the present disclosure, the sensing of the UE may include PSSCH-RSRP measurement based on PSSCH DM-RS sequence, PSSCH-RSRP measurement based on the PSSCH DM-RS sequence scheduled by the PSCCH successfully decoded by the UE, sidelink RSSI (S-RSSI) measurement, and/or S-RSSI measurement based on sub-channel related to V2X resource pool. In various embodiments of the present disclosure, transmission of the UE may include transmission of a sidelink channel and/or a sidelink signal (e.g., PSCCH, PSSCH, PSFCH, PSBCH, PSSS/SSSS, etc.). Transmission of the UE may include transmission of a WAN UL channel and/or a WAN UL signal (e.g., PUSCH, PUCCH, SRS, etc.). In various embodiments of the present disclosure, the synchronization signal may include SLSS and/or PSBCH.

In various embodiments of the present disclosure, the configuration may include signaling, signaling from the network, configuration from the network, and/or pre-configuration from the network. In various embodiments of the present disclosure, the definition may include signaling, signaling from the network, configuration from the network, and/or pre-configuration from the network. In various embodiments of the present disclosure, the designation may include signaling, signaling from the network, configuration from the network, and/or pre-configuration from the network.

In various embodiments of the present disclosure, Prose Per Packet Priority (PPPP) may be replaced by Prose Per Packet Reliability (PPPR), and PPPR may be replaced by PPPP. For example, a smaller PPPP value may mean a higher priority, and a larger PPPP value may mean a lower priority. For example, a smaller PPPR value may mean higher reliability, and a larger PPPR value may mean lower reliability. For example, the PPPP value related with a high priority service, packet, or message may be smaller than the PPPP value related with a low priority service, packet, or message. For example, the PPPR value related with a high reliability y service, packet, or message may be smaller than the PPPP value related with a low reliability service, packet, or message.

In various embodiments of the present disclosure, at least one of a unicast session (e.g., a unicast session for sidelink), a groupcast/multicast session (e.g., a groupcast/multicast session for sidelink), and/or a broadcast session (e.g., a broadcast session for a sidelink).

In various embodiments of the present disclosure, a carrier may be extendedly interpreted as at least one of a BWP and/or a resource pool. For example, the carrier may include at least one of a BWP and/or a resource pool. For example, a carrier may include one or more BWPs. For example, a BWP may include one or more resource pools.

In various embodiments of the present disclosure, the transmitting UE may refer to a UE that transmits the preemptive message, and the receiving UE may refer to a UE that receives the preemptive message.

In various embodiments of the present disclosure, the HARQ feedback resource may include a HARQ-NACK resource and a HARQ-ACK resource. The HARQ feedback resource may include a HARQ feedback resource pool, and the HARQ-ACK resource may include an HARQ-ACK resource pool. PSCCH resources may include a PSCCH resource pool.

In various embodiments of the present disclosure, The UE may transmit the PSCCH and/or PSSCH, and may receive HARQ feedback information related to the PSCCH and/or PSSCH transmitted by the UE through the HARQ feedback resources. For example, the UE may transmit PSCCH and/or PSSCH, and may receive HARQ feedback information related to PSCCH and/or PSSCH transmitted by the UE on HARQ feedback resources linked to PSCCH and/or PSSCH. For example, the HARQ feedback information may include HARQ-ACK information or information on whether data decoding is successful.

Figure 15:
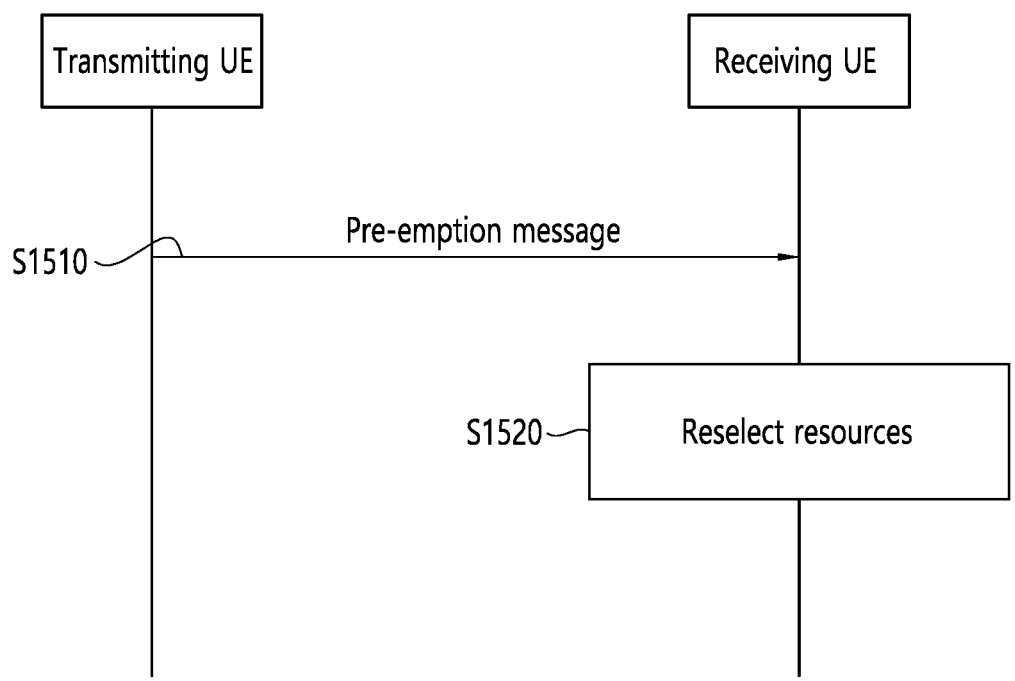
FIG. 15 shows a procedure for a UE to transmit a preemption message to another UE according to an embodiment of the present disclosure.
Figure 16:
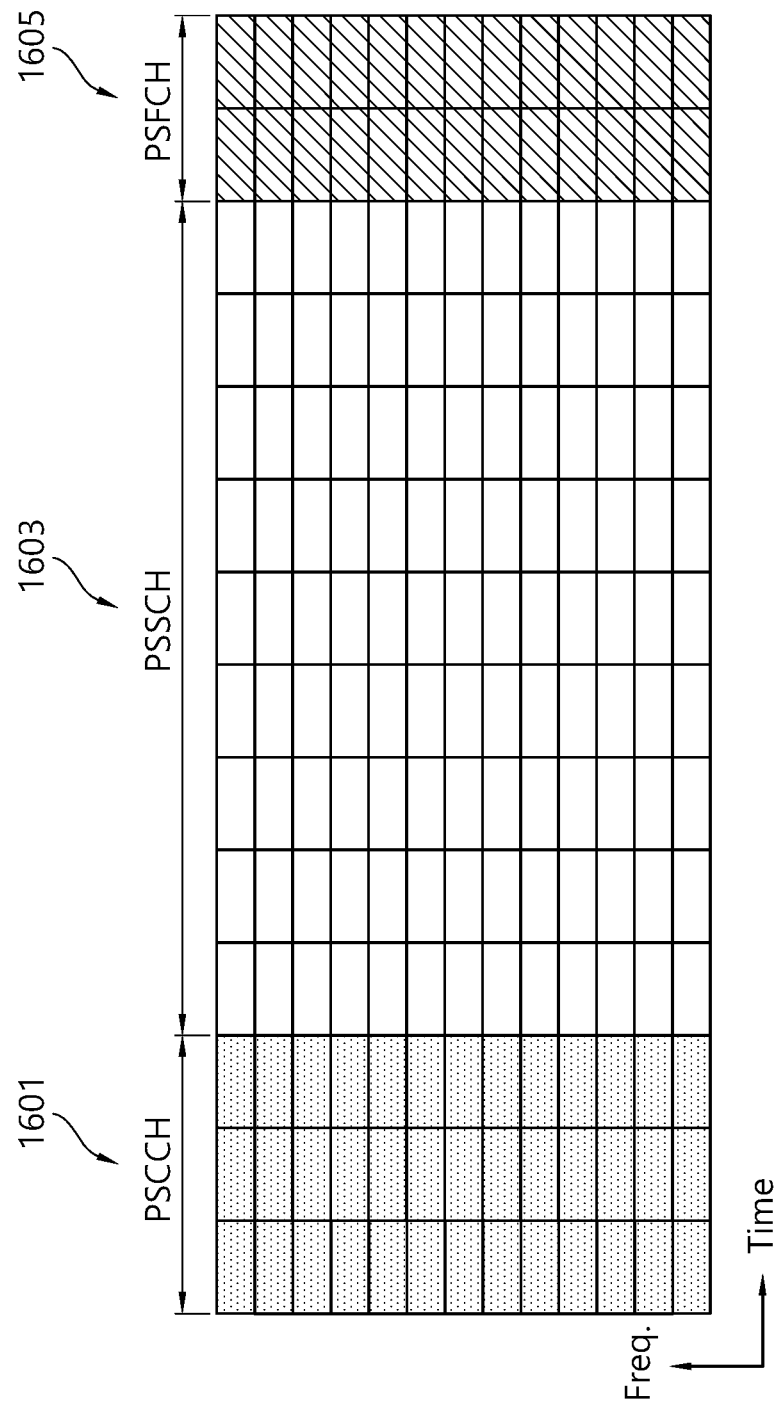
FIG. 16 shows an example of feedback resources related to transmission of preemption message according to an embodiment of the present disclosure.
Figure 17:
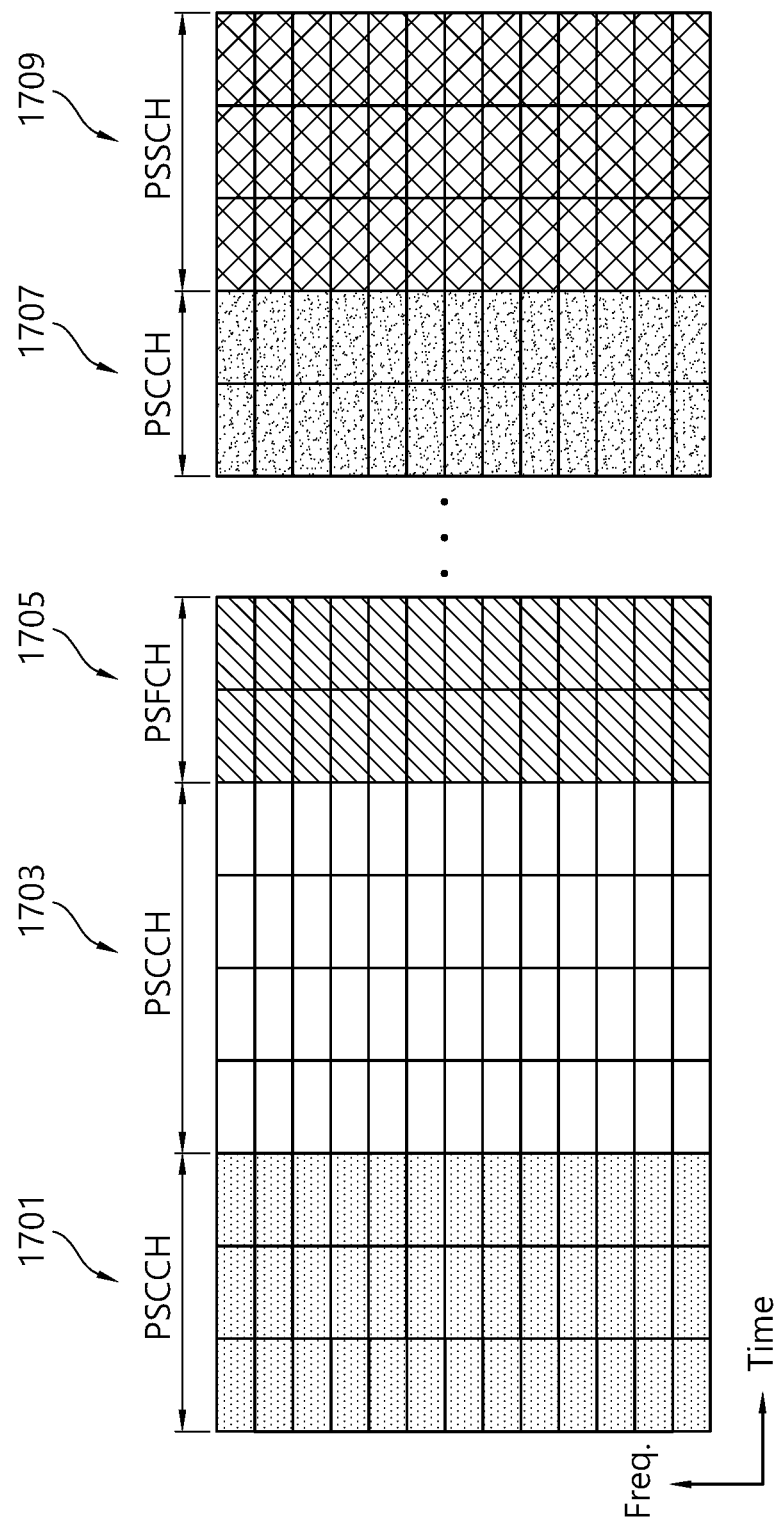
FIG. 17 shows an example of feedback resources related to transmission of preemption message according to an embodiment of the present disclosure.
Figure 18:
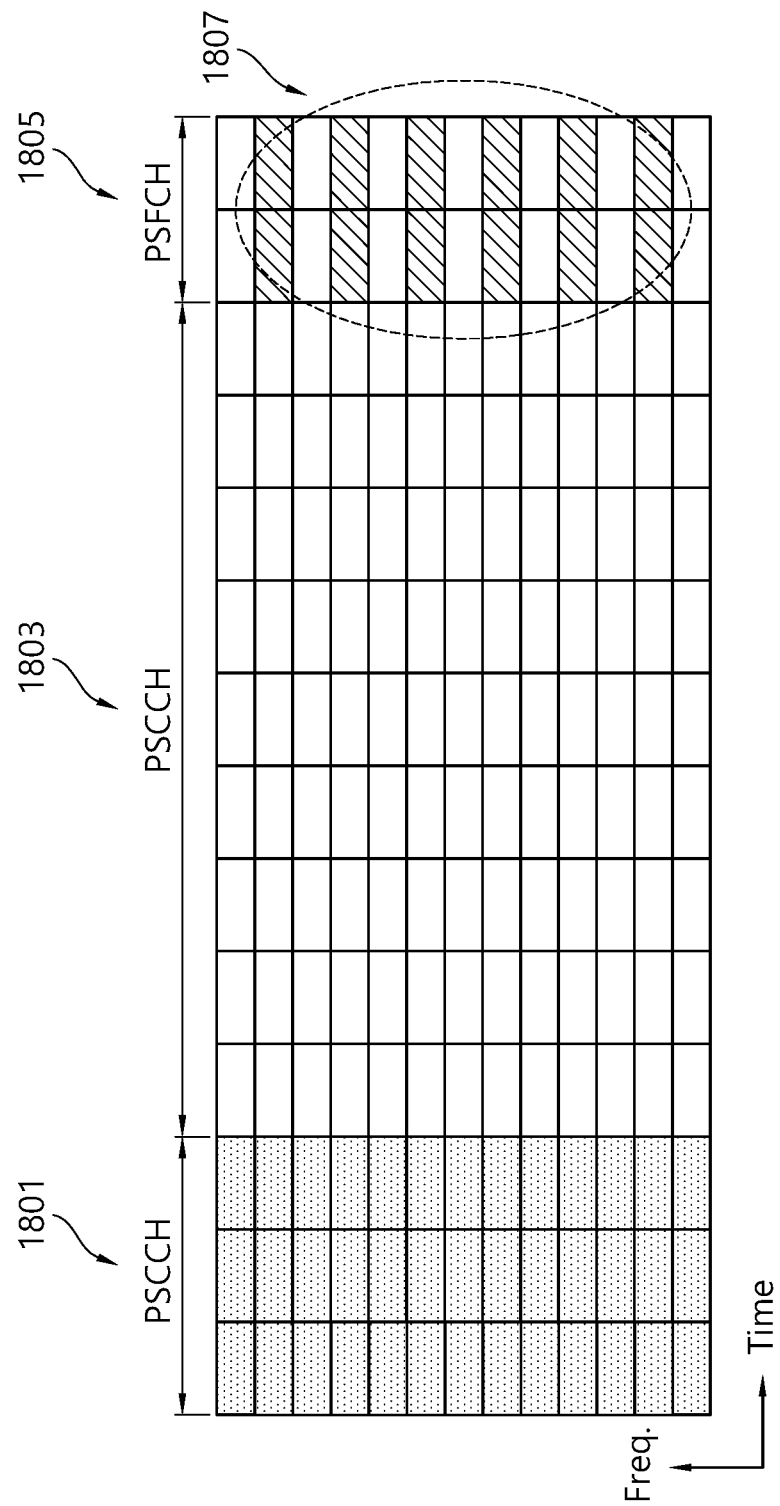
FIG. 18 shows an example of comb type-feedback resources related to transmission of preemption message according to an embodiment of the present disclosure.

FIG. 15 shows a procedure for a UE to transmit a preemption message to another UE according to an embodiment of the present disclosure. FIGS. 16 to 18 show examples of feedback resources related to transmission of preemption message according to an embodiment of the present disclosure.

FIG. 15 is an example of a procedure for a transmitting UE to transmit a pre-emption message to a receiving UE. Referring to FIG. 15, the transmitting UE may transmit a pre-emption message to the receiving UE S1510, the receiving UE may determine whether to reselect all or part of the reserved resources based on the received preemption message S1520.

More specifically, Referring to FIG. 15, in step S1510, the transmitting UE may transmit a preemption message to the receiving UE. For example, the transmitting UE may transmit the preemption message to the receiving UE through the HARQ feedback resources. Referring to FIG. 16, for example, the HARQ feedback resources may be a physical sidelink feedback channel (PSFCH) 1605 resources.

According to an embodiment of the present disclosure, the transmitting UE may transmit the pre-emption message through the HARQ-ACK resources. For example, the transmitting UE may transmit the pre-emption message on a linked HARQ-ACK resources. For example, when the transmitting UE transmits a message related to a service with a relatively high priority or a message related to a service with a higher priority than a pre-determined threshold, the transmitting UE may transmit the pre-emption message including resource information, resource location information, priority information, proximity-based service per-packet priority (PPPP), proximity services per-packet reliability (PPPR), and latency budge related to the transmission of the message to other UEs through a pre-defined channel. Accordingly, the transmitting UE may effectively protect a message of a relatively high priority.

According to an embodiment, when the receiving UE receives the pre-emption message transmitted through the HARQ feedback resources by the transmitting UE, a problem in which the receiving UE does not receive the pre-emption message (e.g., a half-duplex problem) can be alleviated. For example, when the receiving UE receives the pre-emption message transmitted through the HARQ feedback resources by the transmitting UE, the problem that the receiving UE does not receive the pre-emption message due to its PSCCH/PSSCH transmission can be alleviated.

Meanwhile, when the UE receives HARQ feedback information through the HARQ feedback resources, the UE may basically have to perform a new AGC operation (at the time of reception, due to the HARQ feedback information related to communication of other FDM UEs that the UE does not actually need to receive). For example, between the reception of the PSCCH/PSSCH for the UE and the reception of HARQ feedback information for the UE, a different or independent AGC operation may be required. In addition, for example, when the power configuration or power operation related to transmission of the HARQ feedback information of the UE and the power configuration or power operation related to the PSCCH/PSSCH transmission of the UE are different, another UE may have to newly perform an AGC operation in order to receive HARQ feedback information through the HARQ feedback resources. Therefore, according to an embodiment of the present disclosure, when the UE transmits the pre-emption message to other UEs through the HARQ feedback resources, the UE performs an additional AGC operation required for receiving HARQ feedback information, but a new AGC may not be required. On the other hand, when the UE transmits the pre-emption message to other UEs on all or part of the PSCCH (and/or PSSCH) transmission resources, additional or new AGC (e.g., AGC for PSSCH reception) may be required for the UE.

According to an embodiment, after the transmitting UE transmits the pre-emption message through the HARQ feedback resources, the transmitting UE may perform PSCCH transmission and/or PS SCH transmission on a slot after the HARQ feedback resources. Referring to FIG. 17, for example, after the transmitting UE transmits the pre-emption message through the HARQ feedback resources 1705, the transmitting UE may perform PSCCH 1707 transmission and/or PSSCH 1709 transmission through the earliest/closest slot after the HARQ feedback resources.

According to an embodiment, the transmitting UE may transmit the pre-emption message through the HARQ feedback resources, and perform only PSSCH transmission in consideration of a time for decoding the pre-emption message. For example, referring to FIG. 17, the transmitting UE may transmit the pre-emption message to the receiving UE through the HARQ feedback resources 1705, and perform PSSCH 1709 transmission without transmitting the PSCCH 1707 after the time for decoding the pre-emption message. For example, the transmitting UE may transmit the pre-emption message to the receiving UE through the HARQ feedback resources 1705, and perform PSSCH 1709 transmission without transmitting the PSCCH (1707) after a pre-determined time.

According to an embodiment, the transmitting UE may transmit the pre-emption message through the HARQ feedback resources and/or the PSCCH resources. For example, the transmitting UE may transmit the pre-emption message through the PSCCH resources after the HARQ feedback resources. For example, the transmitting UE may transmit the pre-emption message through the PSCCH resource pool after the HARQ feedback resource pool. For example, referring to FIG. 17, the transmitting UE may transmit the pre-emption message through the PSCCH 1707 resources corresponding to the fastest/nearest slot after the HARQ feedback resources 1705. For example, the transmitting UE may transmit the preemption message through the PSCCH resource pool corresponding to the earliest/closest slot after the HARQ feedback resource pool.

According to an embodiment, resources used for transmitting a pre-emption message on PSCCH resources and resources used for PSCCH transmission may be configured differently. For example, when the transmitting UE fails to transmit the pre-emption message to the receiving UE through the HARQ feedback resources, the transmitting UE transmits the pre-emption message to the receiving UE through the PSCCH resources corresponding to the earliest/closest slot after the HARQ feedback resources, so that the transmitting UE can increase the probability of successfully transmitting the pre-emption message to the receiving UE.

According to an embodiment, even when the HARQ feedback resources are disabled, the transmitting UE may use the HARQ feedback resources for pre-emption message transmission, not for HARQ feedback transmission. Herein, the case in which the HARQ feedback resources are disabled may include a case in which it is necessary to transmit HARQ feedback, but the transmission function of the transmitting UE is turned off, or a case in which the HARQ feedback resources are allocated but the HARQ feedback resources are used for other purposes.

According to an embodiment, the resources used to transmit the pre-emption message may be configured in an arrangement in which transmission resources are distributed according to a pre-determined interval in the frequency domain of the HARQ feedback resources. Referring to FIG. 18, for example, the resources used to transmit the pre-emption message may be configured in an arrangement 1807 (e.g., a COMB-like arrangement) in which transmission resources are distributed according to a pre-determined interval in the frequency domain of the HARQ feedback resources 1805. For example, if a sub-channel used for sidelink communication has a resource structure with the arrangement/order of "PSCCH, PSSCH, and HARQ feedback in the time domain, the resources used to transmit the pre-emption message may be configured in an arrangement 1807 (e.g., a COMB-like arrangement) in which transmission resources are distributed according to a pre-determined interval in the frequency domain of the HARQ feedback resources 1805. Due to this arrangement, the PAPR problem can be alleviated. The arrangement of the resources used to transmit the pre-emption message may be in a different arrangement and the arrangement of the resources is not limited.

According to an embodiment of the present disclosure, a transmitting UE may transmit a pre-emption message to a receiving UE through PSCCH resources. Although the AGC value related to PSCCH reception may be greater than the AGC value required for PSSCH reception, because quantization noise is simply added (in the PSSCH reception), it may not cause a big problem for the transmitting UE to transmit the pre-emption message through the PSCCH resource. For example, when the transmitting UE transmits at least one of information with a higher pre-configured level of importance (than a threshold value), information with a higher pre-configured level of priority (than a threshold value), or information on a pre-configured type through the PSSCH resources, the transmitting UE may not transmit the pre-emption message through the PSCCH resources. When the transmitting UE does not transmit at least one of information with a higher pre-configured level of importance (than a threshold value), information with a higher pre-configured level of priority (than a threshold value), or information on a pre-configured type through the PSSCH resources, the transmitting UE may transmit the pre-emption message through the PSCCH resources or linked PSCCH resources. According to an embodiment, in a case where transmission for pre-emption message is permitted/configured through the PSCCH resources, AGC related to PSSCH reception and AGC related to PSSCH reception may be performed independently. For example, when the priority related to sidelink data and/or control information to be transmitted by the transmitting UE through the PSCCH resources is lower than a pre-configured threshold, the transmitting UE may transmit the pre-emption message through the PSCCH resources. For example, when the priority related to sidelink data and/or control information to be transmitted by the transmitting UE through the PSCCH resources is higher than a pre-configured threshold, the transmitting UE may not transmit the pre-emption message through the PSCCH resource.

According to an embodiment, the transmitting UE may receive sidelink data and/or control information from the receiving UE, and transmit the pre-emption message to the receiving UE through a PSFCH resource related with the received sidelink data and/or control information. For example, the transmitting UE may transmit the pre-emption message, information on whether data decoding is successful, or HARQ-ACK information (e.g., ACK, NACK or DTX) through the HARQ feedback resources related with the received sidelink data and/or control information.

Additionally, the UE may transmit HARQ feedback to other UEs based on the PSSCH reception timing. For example, the UE may transmit the HARQ feedback to other UEs based on the timing of PSCCH/PSSCH transmission or reception linked to the HARQ feedback. For example, the UE may transmit HARQ feedback to other UEs based on a pre-configured timing. According to an embodiment, the UE may transmit HARQ feedback to other UEs according to a pre-configured rule-based (time/frequency) synchronization. For example, the UE may transmit HARQ feedback according to synchronization (time/frequency) related to a synchronous cluster of the UE receiving the HARQ feedback. For example, the UE may perform sidelink data and/or control information transmission (and/or reception) according to its sync cluster-related (time/frequency) synchronization (or the UE may perform sidelink data and/or control information reception according to the synchronization cluster related (time/frequency) synchronization of the UE performing the transmission), and the UE may transmit the HARQ feedback according to the sync cluster-related (time/frequency) synchronization of the UE receiving the HARQ feedback (or the UE may transmit the HARQ feedback according to the sync cluster-related (time/frequency) synchronization of the UE). That is, the UE may transmit the HARQ feedback according to a timing derived from a synchronous source used to receive sidelink data and/or control information from the UE receiving the HARQ feedback. For this reason, the UE receiving the HARQ feedback may not perform unnecessary adjustment to receive the HARQ feedback.

Meanwhile, when resources related to broadcast and HARQ feedback resources related to unicast (e.g., the last symbol in a slot) are FDMed, the UE receiving sidelink data and/or control information on the resources related to broadcast may need to perform AGC over again in symbols (e.g., the last symbol in a slot) in which HARQ feedback resources related to unicast and resources related to broadcast are FDMed. For example, when HARQ feedback resources related to multicast/groupcast and resources related to broadcast (e.g., the last symbol in a slot) are FDMed, the UE receiving sidelink data and/or control information on the resources related to broadcast may need to perform AGC over again in symbols (e.g., the last symbol in a slot) in which HARQ feedback resources related to multicast/groupcast and resources related to broadcast are FDMed. In this case, the following method may be applied.

For example, when the UE receives the PSCCH and/or PSSCH on the FDMed resources for the HARQ feedback resources and, the UE may perform AGC again.

For example, the UE may TDM the HARQ feedback transmission resources and the PSCCH transmission resources and/or PSSCH transmission resources. For example, the UE may transmit PSFCH and PSCCH/PSSCH at different times.

For example, the UE senses whether HARQ feedback transmission is actually performed on the HARQ feedback resources, and only when HARQ feedback transmission is not actually performed, the UE may perform PSCCH transmission and/or PSSCH transmission on the FDMed resources for the HARQ feedback resource. For example, the UE may determine whether HARQ feedback transmission has actually been performed by decoding previously received data. When HARQ feedback transmission is actually performed, the UE may skip PSCCH transmission and/or PSSCH transmission on the FDMed resources for the HARQ feedback resources. For example, the UE may signal information related to skipping the PSCCH transmission and/or PSSCH transmission on the PSCCH. Herein, the information related to skipping the PSCCH transmission and/or PSSCH transmission may include information on whether to skip PSCCH transmission and/or PSSCH transmission, and location information related to skipping PSCCH transmission and/or PSSCH transmission. For example, when HARQ feedback transmission is actually performed, the UE may puncture or rate match all or part of PSCCH and/or PSSCH transmission on the FDMed resources for the HARQ feedback resource.

In step S1520, the receiving UE may determine whether to reselect all or part of the resources reserved by the receiving UE based on the pre-emption message. For example, when the priority related to sidelink data and/or information to be transmitted through all or part of the resources reserved by the receiving UE is lower than the priority related to sidelink data and/or control information included in the pre-emption message, the receiving UE may trigger reselection of all or part of the reserved resources. The receiving UE may reselect all or part of the reserved resources as resources that do not overlap with resources to be used for transmission of sidelink data and/or control information related to the pre-emption message.

Figure 19:
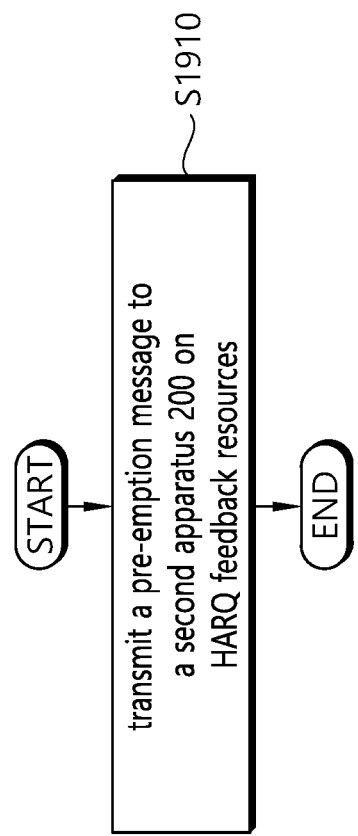
FIG. 19 shows a method for the first device 100 to perform pre-emption message transmission in accordance with an embodiment of the present disclosure.

FIG. 19 shows a method for the first device 100 to perform pre-emption message transmission in accordance with an embodiment of the present disclosure.

In step S1910, the first apparatus 100 may transmit a pre-emption message to the second apparatus 200 on the HARQ feedback resources. For example, the first apparatus 100 may transmit the pre-emption message to the second apparatus 200 on the PSFCH resources. Herein, the pre-emption message may be a message for notifying information related to transmission of a first sidelink information having a relatively high priority. The first sidelink information may include sidelink data and/or control information to be transmitted by the first apparatus 100. The information related to transmission of the first sidelink information may be at least one of sidelink information related to a high-priority service, sidelink information related to a service requiring high reliability, or sidelink information related to a service requiring low latency. For example, the first apparatus 100 may transmit the pre-emption message to the second apparatus 200 based on sidelink information having a priority higher than a pre-configured threshold. The pre-emption message may include at least one of priority information related to the first sidelink information, PPPP, PPPR, latency budget, MCS information, time resource pattern information, frequency resource pattern information, HARQ process ID, source ID, or destination ID.

According to an embodiment, the resources used to transmit the pre-emption message may be configured in an arrangement in which transmission resources are distributed according to a pre-determined interval in the frequency domain of the HARQ feedback resources. For example, the resources used to transmit the pre-emption message may be configured in an arrangement (e.g., a COMB-like arrangement) in which transmission resources are evenly distributed according to a pre-determined interval in the frequency domain of the HARQ feedback resources. However, the arrangement of the resources used to transmit the pre-emption message may be in a different arrangement and the arrangement of the resources is not limited.

According to an embodiment, the first apparatus 100 may transmit the pre-emption message on the HARQ feedback resources to the second apparatus 200, and may perform PSCCH and/or PSSCH transmission on a slot after the HARQ feedback resources. For example, after transmitting the pre-emption message to the second apparatus 200 on the PSFCH resources, the first apparatus 100 may transmit the second sidelink information on the PSCCH and/or PSSCH resource related to the closest slot. The first apparatus 100 may transmit the pre-emption message on the HARQ feedback resources to the second apparatus 200 and may perform PSSCH transmission on a subsequent slot. For example, the first apparatus 100 may transmit the pre-emption message to the second apparatus 200 and perform PSSCH transmission without PSCCH transmission after a pre-determined time. That is, the first apparatus 100 may transmit the pre-emption message to the second apparatus 200 and transmit the second sidelink information on the PSSCH resources after a pre-determined time. Herein, the pre-determined time may include a time for the second apparatus 200 to decode the pre-emption message. That is, the second apparatus 200 may receive PSSCH based on at least one of priority information related to the second sidelink information, PPPP, PPPR, latency budget, MCS information, time resource pattern information, frequency resource pattern information, HARQ process ID, or source ID, included in the pre-emption message.

According to an embodiment, the first apparatus 100 may transmit the pre-emption message to the second apparatus 200 not only on the HARQ feedback resources from the second apparatus 200 but also on the PSCCH resources after the HARQ feedback resources. For example, the first apparatus 100 may transmit the pre-emption message to the second apparatus 200 on the PSCCH resources related to the closest slot after the HARQ feedback resources. For example, resources used for transmitting the pre-emption message on PSCCH resources and resources used for PSCCH transmission may be configured differently. That is, when the first apparatus 100 fails to transmit the pre-emption message to the second apparatus 200 on the HARQ feedback resources, the first device 100 transmits the pre-emption message on the PSCCH resources related to the closest slot after the HARQ feedback resources to the second apparatus 200, thereby increasing the probability of successfully transmitting the pre-emption message.

According to an embodiment, when the HARQ feedback resources are disabled, the first apparatus 100 may use the HARQ feedback resources for pre-emptive message transmission, not for HARQ feedback transmission. Herein, the case in which the HARQ feedback resources are disabled may include a case in which it is necessary to transmit HARQ feedback, but the transmission function of the first apparatus is turned off, or a case in which the HARQ feedback resources are allocated but the HARQ feedback resources are used for other purposes.

Figure 20:
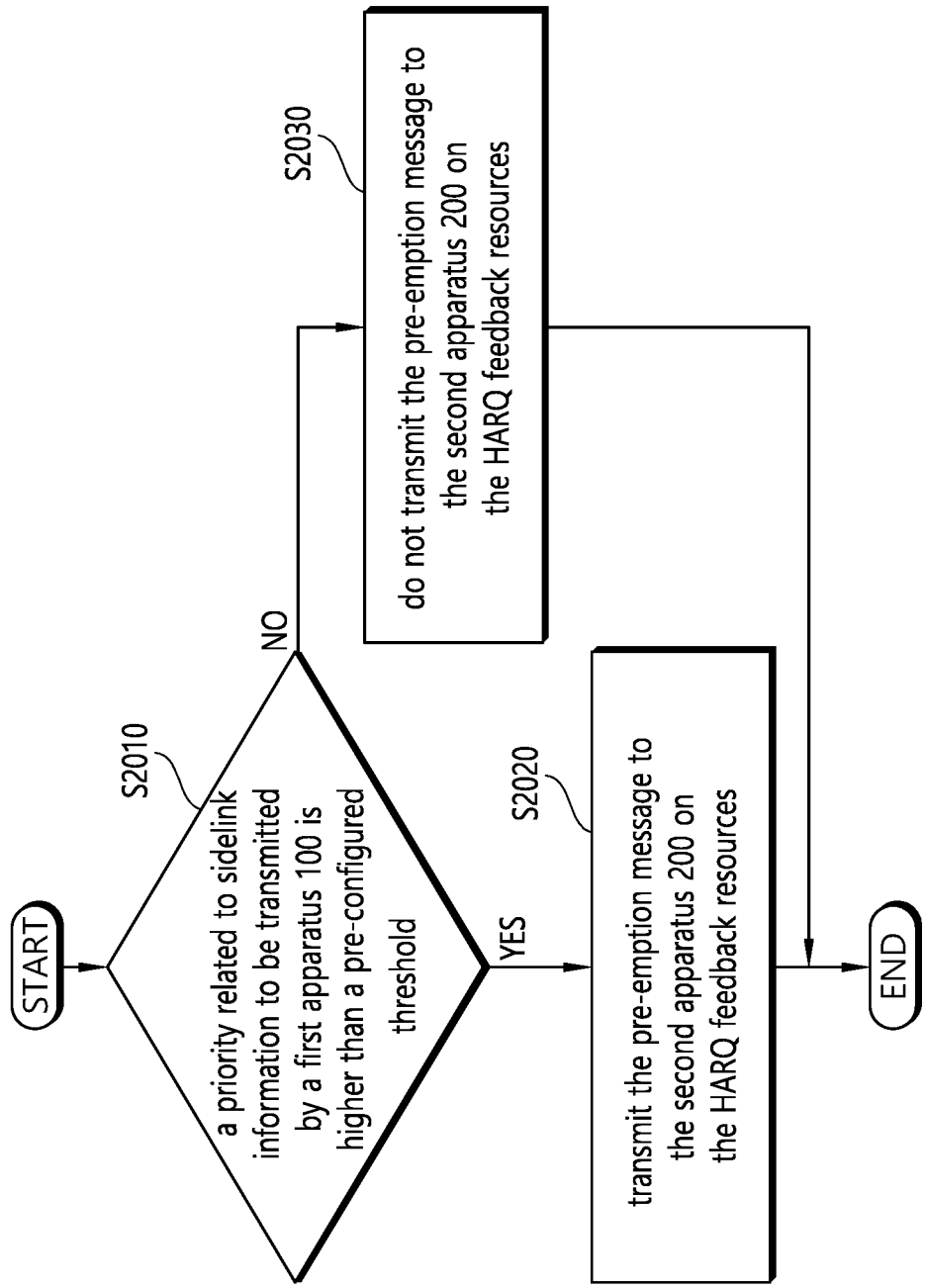
FIG. 20 shows a method for the first device 100 to perform pre-emption message transmission on the HARQ feedback resources in accordance with an embodiment of the present disclosure.

FIG. 20 shows a method for the first device 100 to perform pre-emption message transmission on the HARQ feedback resources in accordance with an embodiment of the present disclosure.

FIG. 20 is an example of a trigger condition for the first apparatus 100 to transmit the pre-emption message on the HARQ feedback resources to the second apparatus 200. Trigger conditions for the first apparatus 100 to transmit the pre-emption message to the second apparatus 200 may vary, and are not limited to the embodiment.

Referring to FIG. 20, in step S2010, the first apparatus 100 may determine whether a priority related to sidelink information to be transmitted is higher than a pre-configured threshold. In step S2020, when the priority related to sidelink information to be transmitted by the first apparatus 100 is higher than the pre-configured threshold, the first apparatus 100 may transmit the pre-emption message to the second apparatus 200 on the HARQ feedback resources. In step S2030, when the priority related to sidelink information to be transmitted by the first apparatus 100 is lower than a pre-configured threshold, the first apparatus 100 may not transmit the pre-emption message to the second apparatus 200 on the HARQ feedback resources.

According to an embodiment, the first apparatus 100 may check an interference level for resources related to sidelink information to be transmitted. When the interference level for resources related to sidelink information to be transmitted by the first apparatus 100 is higher than a threshold value, the first apparatus 100 may transmit the pre-emption message to the second apparatus 200 on the HARQ feedback resources. When the interference level for resources related to sidelink information to be transmitted by the first apparatus 100 is lower than a threshold value, the first apparatus 100 may not transmit the pre-emption message to the second apparatus 200 on the HARQ feedback resources.

Figure 21:
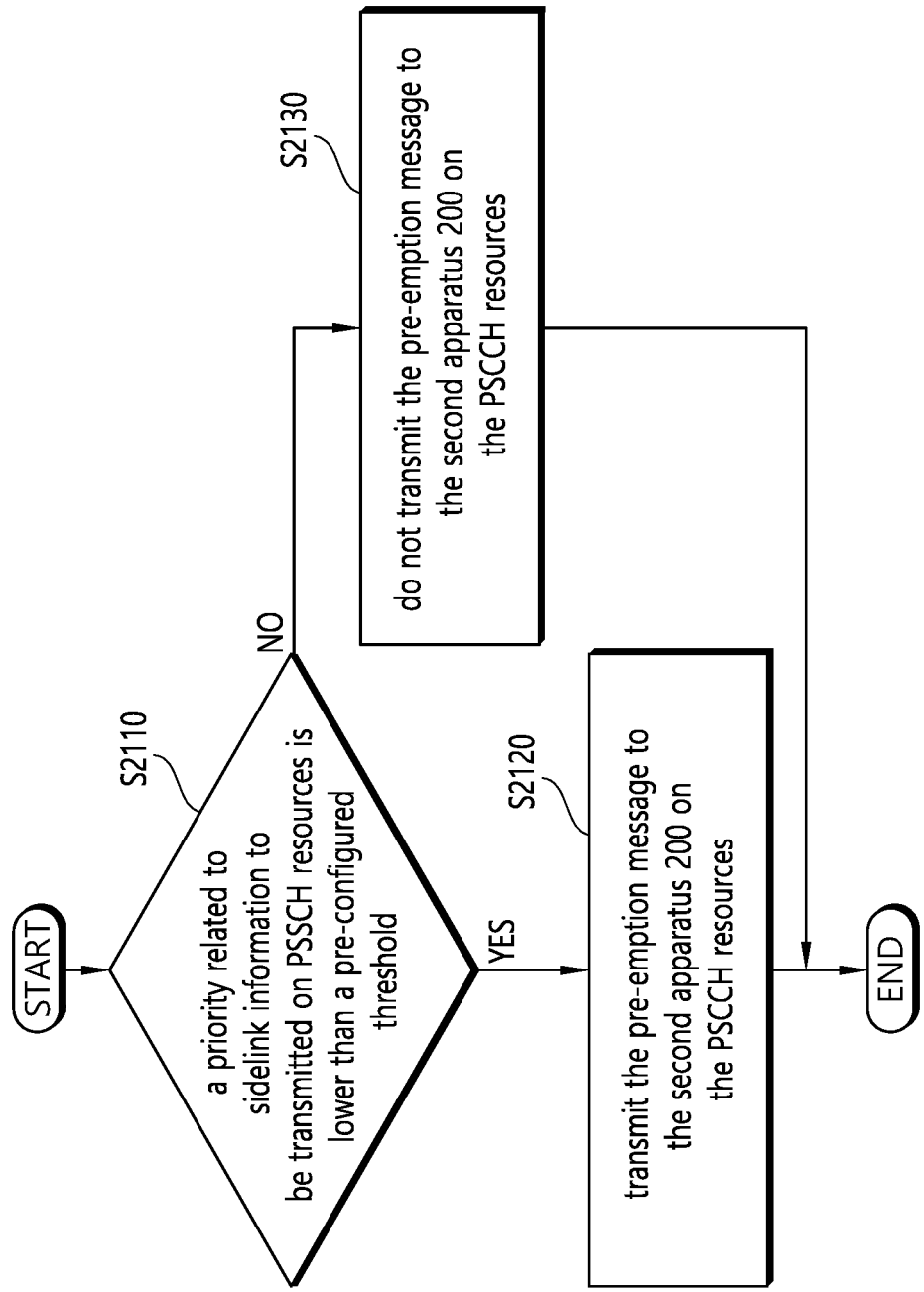
FIG. 21 shows a method for the first device 100 to perform pre-emption message transmission on the PSCCH resources in accordance with an embodiment of the present disclosure.

FIG. 21 shows a method for the first device 100 to perform pre-emption message transmission on the PSCCH resources in accordance with an embodiment of the present disclosure.

FIG. 21 is an example of a trigger condition for the first apparatus 100 to transmit the pre-emption message on the PSCCH resources to the second apparatus 200. Trigger conditions for the first apparatus 100 to transmit the pre-emption message to the second apparatus 200 may vary, and are not limited to the embodiment.

Referring to FIG. 21, in step S2110, the first apparatus 100 may determine whether a priority related to sidelink information to be transmitted on PSSCH resources is lower than a pre-configured threshold. For example, when the first apparatus 100 determine to transmit the pre-emption message to the second apparatus 200, the first apparatus 100 may determine whether the priority related to sidelink information to be transmitted on PSSCH resources is lower than the pre-configured threshold.

In step S2120, when the priority related to sidelink information to be transmitted on PSSCH resources is lower than the pre-configured threshold, the first apparatus 100 may transmit the pre-emption message to the second apparatus 200 on the PSCCH resources. For example, the PSCCH resources may be resources related to sidelink information to be transmitted by the first apparatus 100 on the PSSCH resources.

In step S2130, when the priority related to sidelink information to be transmitted on the PSSCH resources is higher than a pre-configured threshold, the first apparatus 100 may not transmit the pre-emption message to the second apparatus 200 on the PSCCH resources related to the received first sidelink information.

According to an embodiment, when the priority related to sidelink information to be transmitted by the first apparatus 100 is higher than a first pre-configured threshold, the first apparatus 100 may determine whether the priority related to sidelink information to be transmitted on PSSCH resources is lower than a second pre-configured threshold. For example, when the priority related to the sidelink information to be transmitted by the first apparatus 100 is higher than the first pre-configured threshold, and the priority related to the sidelink information to be transmitted by the first apparatus 100 on the PSSCH resource is lower than the second pre-configured threshold, the first apparatus 100 may transmit the pre-emption message to the second apparatus 200 on the PSCCH resources.

According to an embodiment, when the interference level for resources related to sidelink information to be transmitted by the first apparatus 100 is higher than the first pre-configured threshold, the first apparatus 100 may determine whether the priority related to sidelink information to be transmitted on PSSCH resources is lower than the second pre-configured threshold. For example, the interference level for the resources related to the sidelink information to be transmitted by the first apparatus 100 is higher than the first pre-configured threshold, and the priority related to the sidelink information to be transmitted by the first apparatus 100 on the PSSCH resources is lower than the second pre-configured threshold, the first apparatus 100 may transmit the pre-emption message to the second apparatus 200 on the PSCCH resources.

Figure 22:
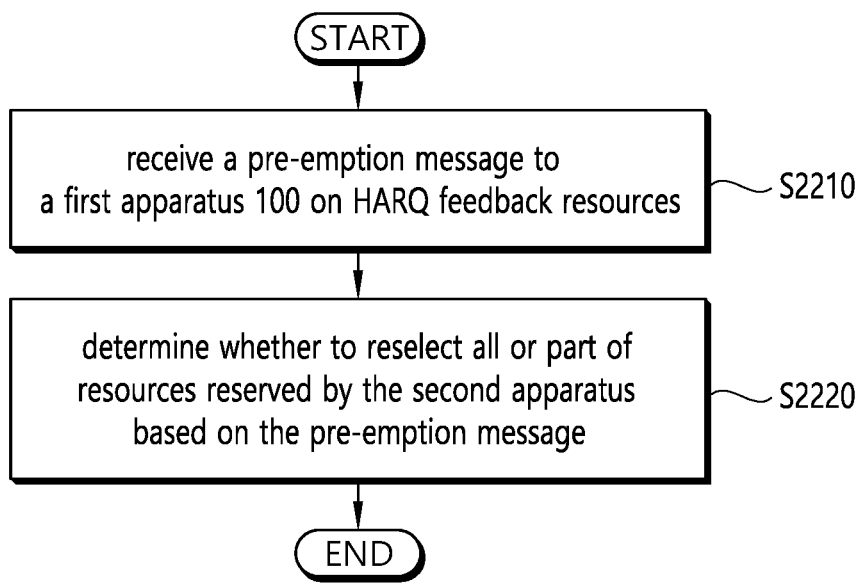
FIG. 22 shows a method for determining whether to reselect resources by the second apparatus 200 based on a pre-emption message according to an embodiment of the present disclosure.
Figure 23:
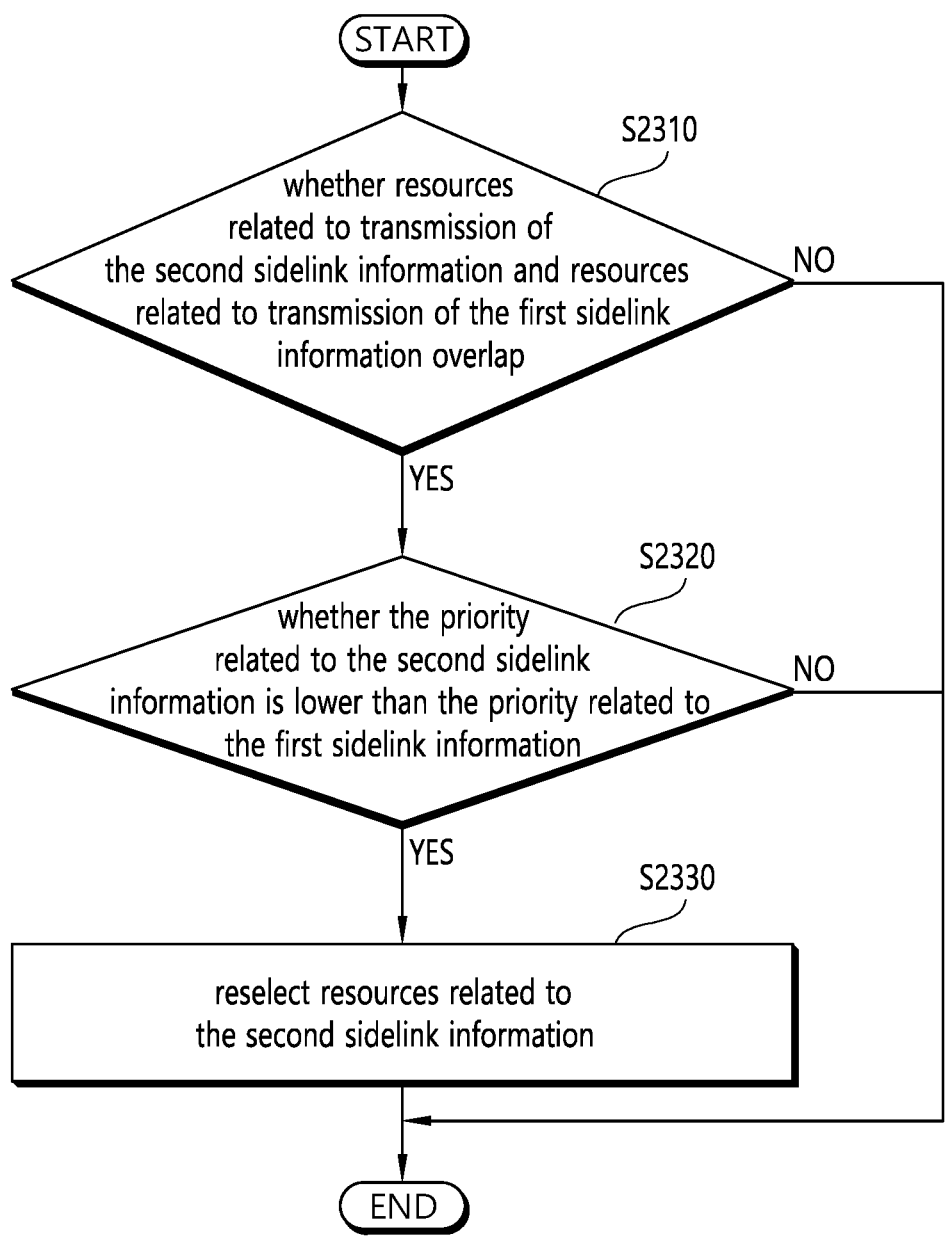
FIG. 23 shows a more specific method for determining whether to reselect resources by the second apparatus 200 based on a pre-emption message according to an embodiment of the present disclosure.

FIG. 22 shows a method for determining whether to reselect resources by the second apparatus 200 based on a pre-emption message according to an embodiment of the present disclosure. FIG. 23 shows a more specific method for determining whether to reselect resources by the second apparatus 200 based on a pre-emption message according to an embodiment of the present disclosure.

Referring to FIG. 22, in step S2210, the second apparatus 200 may receive a pre-emption message from the first apparatus 100 on the HARQ feedback resources. Herein, the pre-emption message may be a message for notifying information related to transmission of the first sidelink information having a relatively high priority. The first sidelink information may include sidelink data and/or control information to be transmitted by the first apparatus 100. The information related to transmission of the first sidelink information may be at least one of sidelink information related to a high-priority service, sidelink information related to a service requiring high reliability, or sidelink information related to a service requiring low latency. The information related to transmission of the first sidelink information may include at least one of priority information related to the first sidelink information, PPPP, PPPR, latency budget, MCS information, time resource pattern information, frequency resource pattern information, HARQ process ID, source ID, or destination ID.

In step S2220, the second apparatus 200 may determine whether to reselect all or part of the resources reserved by the second apparatus 200 based on the pre-emption message. For example, when the priority related to sidelink information to be transmitted through all or part of the resources reserved by the second apparatus 200 is lower than the priority related to the first sidelink information, the second apparatus 200 may trigger reselection for all or part of the reserved resources. The second device 200 may reselect all or part of the reserved resources as resources that do not overlap with resources to be used for transmission of the first sidelink information.

FIG. 23 shows a more detailed example of a step S2220 of determining whether to reselect all or part of the resources reserved by the second apparatus 200.

Referring to FIG. 23, in step S2310, the second apparatus 200 may determine whether resources related to transmission of the second sidelink information and resources related to transmission of the first sidelink information overlap. Herein, the second sidelink information may include sidelink data and/or control information to be transmitted through all or part of the resources reserved by the second apparatus 200. For example, the second apparatus 200 may determine whether all or part of the resources reserved by the second apparatus 200 overlap with resources to be used for transmission of the first sidelink information. For example, the second apparatus 200 may determine whether all or part of the resources reserved by the second apparatus 200 overlap with resources to be used for transmission of the first sidelink information, based on information related to transmission of the first sidelink information (e.g., time resource pattern information and/or frequency resource pattern information) included in the pre-emption message.

In step S2320, when resources related to transmission of the second sidelink information and resources to be used for transmission of the first sidelink information are overlapped, the second apparatus 200 may determine whether the priority related to the second sidelink information is lower than the priority related to the first sidelink information. For example, when all or part of the resources reserved by the second apparatus 200 overlap with resources to be used for transmission of the first sidelink information, the second apparatus 200 may determine whether the priority related to sidelink information to be transmitted through all or part of the resources reserved by the second apparatus 200 is lower than the priority related to the first sidelink information. For example, the second apparatus 200 may determine whether the priority related to sidelink information to be transmitted through all or part of the resources reserved by the second device 200 is lower than the priority related to the first sidelink information based on priority information related to the first sidelink information included in the preemption message. When all or part of the resources reserved by the second device 200 do not overlap with resources to be used for transmission of the first sidelink information, the procedure may be terminated.

In step S2330, when the priority related to the second sidelink information is lower than the priority related to the first sidelink information, the second apparatus 200 may reselect resources related to the second sidelink information as resources that does not overlap with resources to be used for transmission of the first sidelink information. For example, when the priority related to the second sidelink information is lower than the priority related to the first sidelink information, the second apparatus 200 may reselect all or part of resources reserved for transmitting the second sidelink information as resources that does not overlap with resources to be used for transmission of the first sidelink information. When the priority related to the second sidelink information is higher than the priority related to the first sidelink information, the second apparatus 200 may terminate the procedure.

Since examples of the above-described proposed method may also be included as one of the implementation methods of the present disclosure, it is obvious that they may be regarded as a kind of proposed method. In addition, the above-described proposed schemes may be implemented independently, but may be implemented in the form of a combination (or merge) of some of the proposed schemes. As for information on whether to apply the proposed methods (or information on the rules of the proposed methods), a rule may be defined so that the base station informs the UE or the transmitting UE to the receiving UE through a pre-defined signal (e.g., a physical layer signal or a higher layer signal).

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 24:
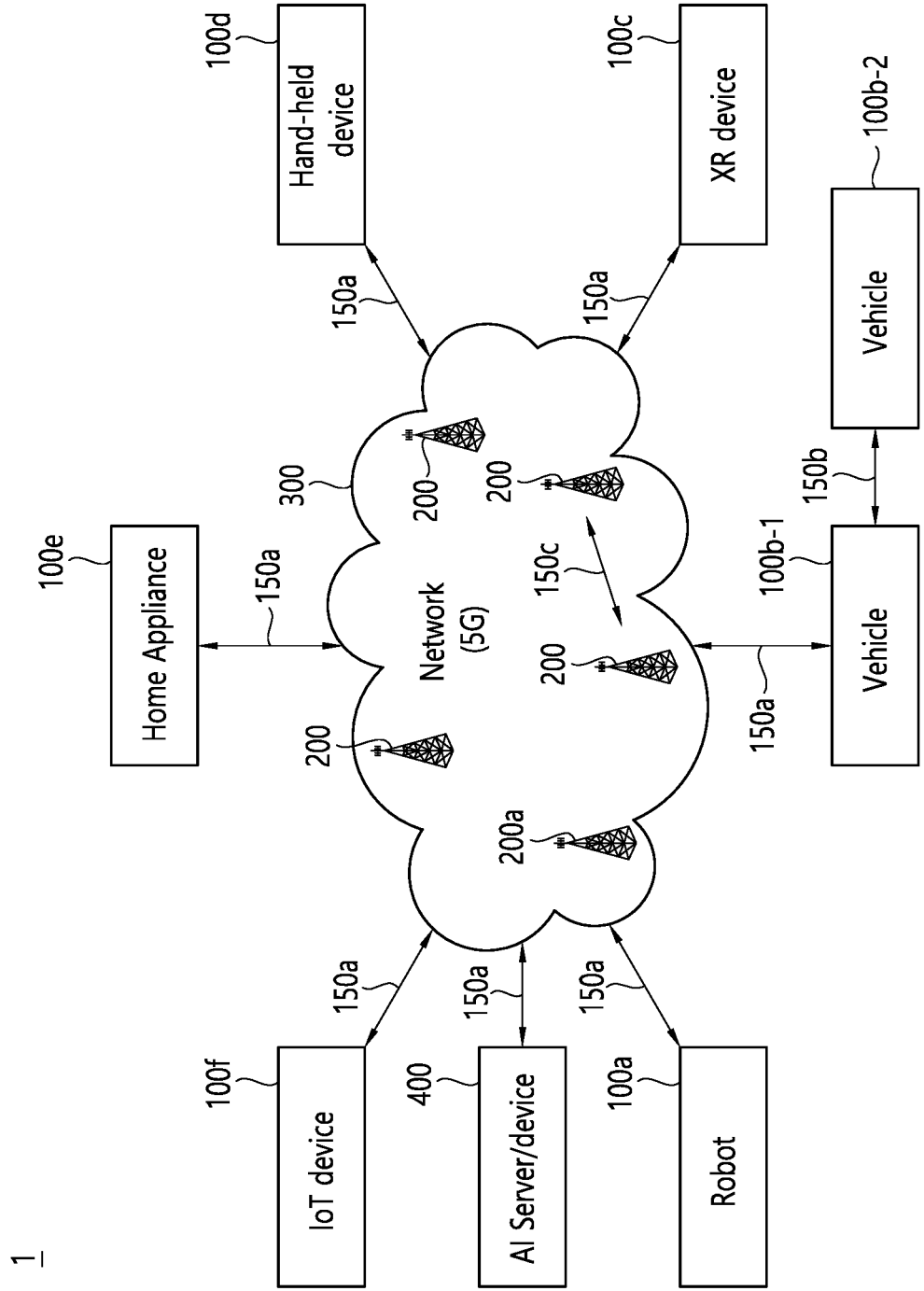
FIG. 24 shows a communication system 1, in accordance with an embodiment of the present disclosure.

FIG. 24 shows a communication system 1, in accordance with an embodiment of the present disclosure.

Referring to FIG. 24, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 25:
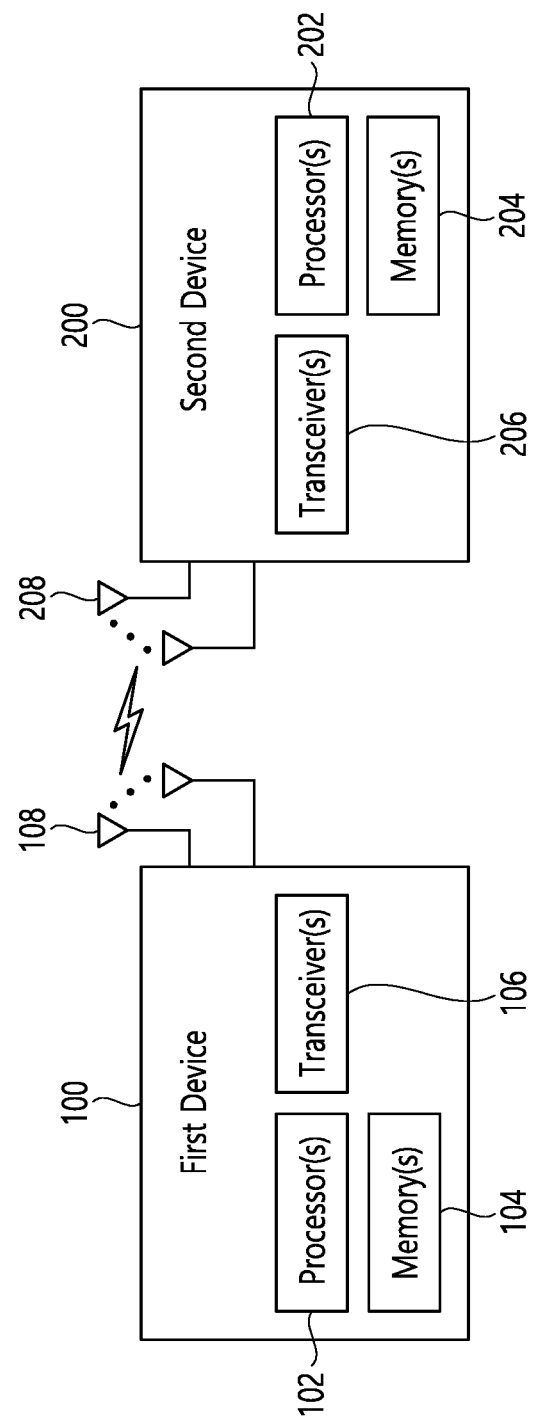
FIG. 25 shows wireless devices, in accordance with an embodiment of the present disclosure.

FIG. 25 shows wireless devices, in accordance with an embodiment of the present disclosure.

Referring to FIG. 25, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 24.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 26:
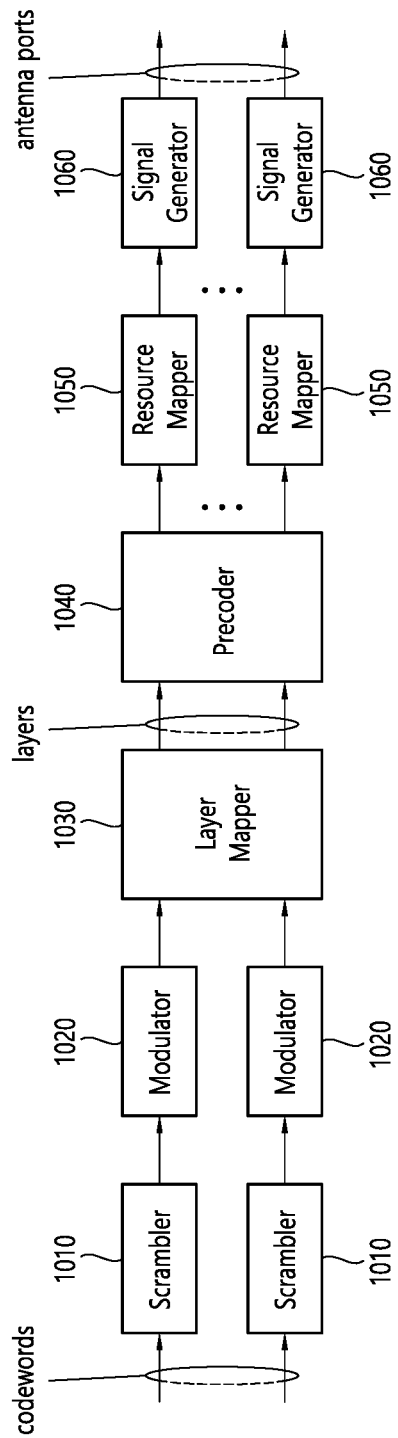
FIG. 26 shows a signal process circuit for a transmission signal, in accordance with an embodiment of the present disclosure.

FIG. 26 shows a signal process circuit for a transmission signal, in accordance with an embodiment of the present disclosure.

Referring to FIG. 26, a signal processing circuit 1000 may include scramblers 1010, modulators 1020, a layer mapper 1030, a precoder 1040, resource mappers 1050, and signal generators 1060. An operation/function of FIG. 26 may be performed, without being limited to, the processors 102 and 202 and/or the transceivers 106 and 206 of FIG. 25. Hardware elements of FIG. 26 may be implemented by the processors 102 and 202 and/or the transceivers 106 and 206 of FIG. 25. For example, blocks 1010 to 1060 may be implemented by the processors 102 and 202 of FIG. 25. Alternatively, the blocks 1010 to 1050 may be implemented by the processors 102 and 202 of FIG. 25 and the block 1060 may be implemented by the transceivers 106 and 206 of FIG. 25.

Codewords may be converted into radio signals via the signal processing circuit 1000 of FIG. 26. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 26. For example, the wireless devices (e.g., 100 and 200 of FIG. 25) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 27:
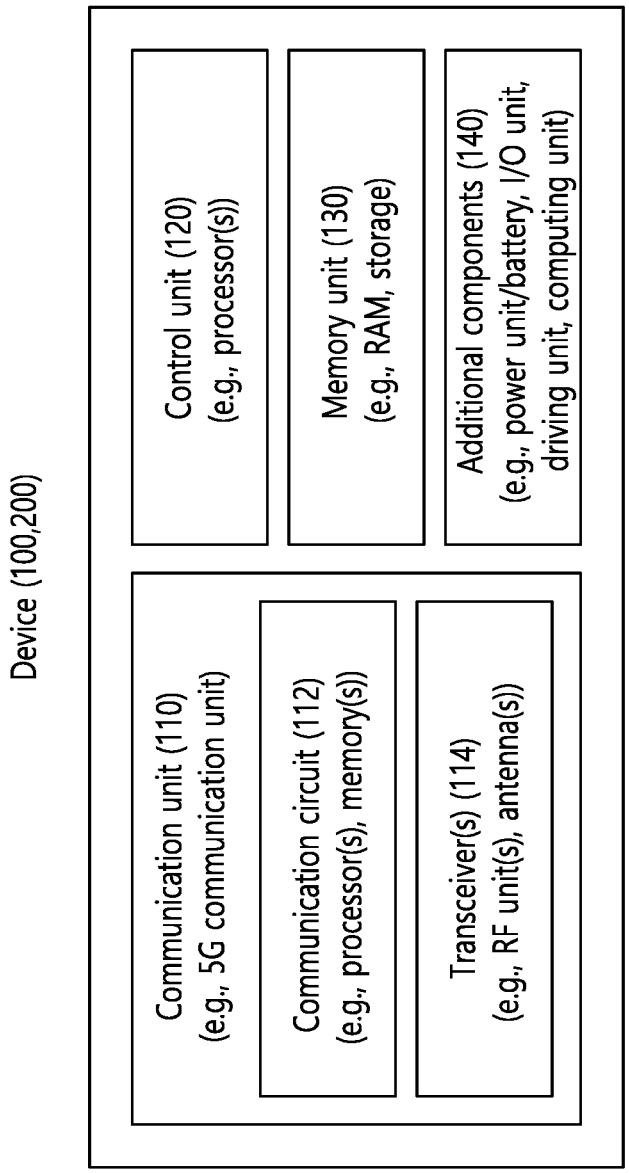
FIG. 27 shows another example of a wireless device, in accordance with an embodiment of the present disclosure.

FIG. 27 shows another example of a wireless device, in accordance with an embodiment of the present disclosure. The wireless device may be implemented in various forms according to a use-case/service (refer to FIG. 24).

Referring to FIG. 27, wireless devices 100 and 200 may correspond to the wireless devices 100 and 200 of FIG. 25 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 25. For example, the transceiver(s) 114 may include the one or more transceivers 106 and 206 and/or the one or more antennas 108 and 208 of FIG. 25. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 24), the vehicles (100b-1 and 100b-2 of FIG. 24), the XR device (100c of FIG. 24), the hand-held device (100d of FIG. 24), the home appliance (100e of FIG. 24), the IoT device (100f of FIG. 24), a digital broadcast terminal, a hologram device, a public safety device, an MTC device, a medicine device, a fintech device (or a finance device), a security device, a climate/environment device, the AI server/device (400 of FIG. 24), the BSs (200 of FIG. 24), a network node, etc. The wireless device may be used in a mobile or fixed place according to a use-example/service.

In FIG. 27, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 27 will be described in detail with reference to the drawings.

Figure 28:
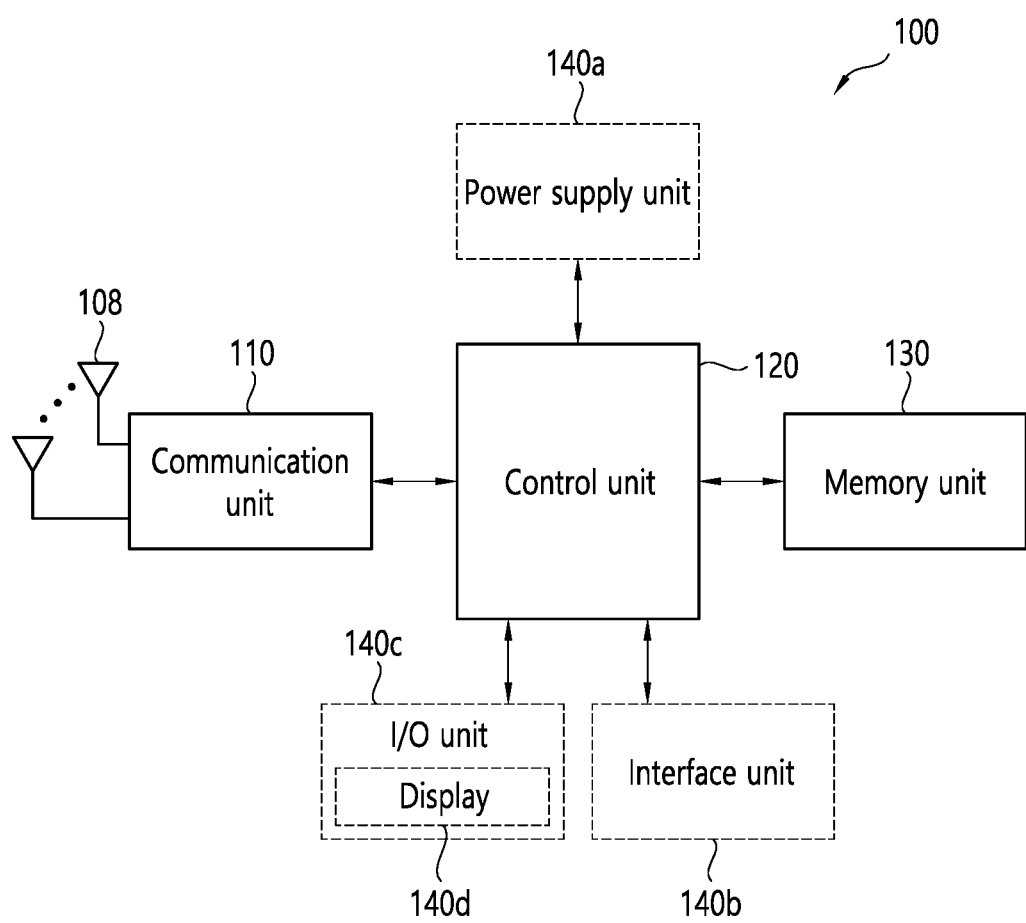
FIG. 28 shows a hand-held device, in accordance with an embodiment of the present disclosure.

FIG. 28 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 28, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 27, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 29:
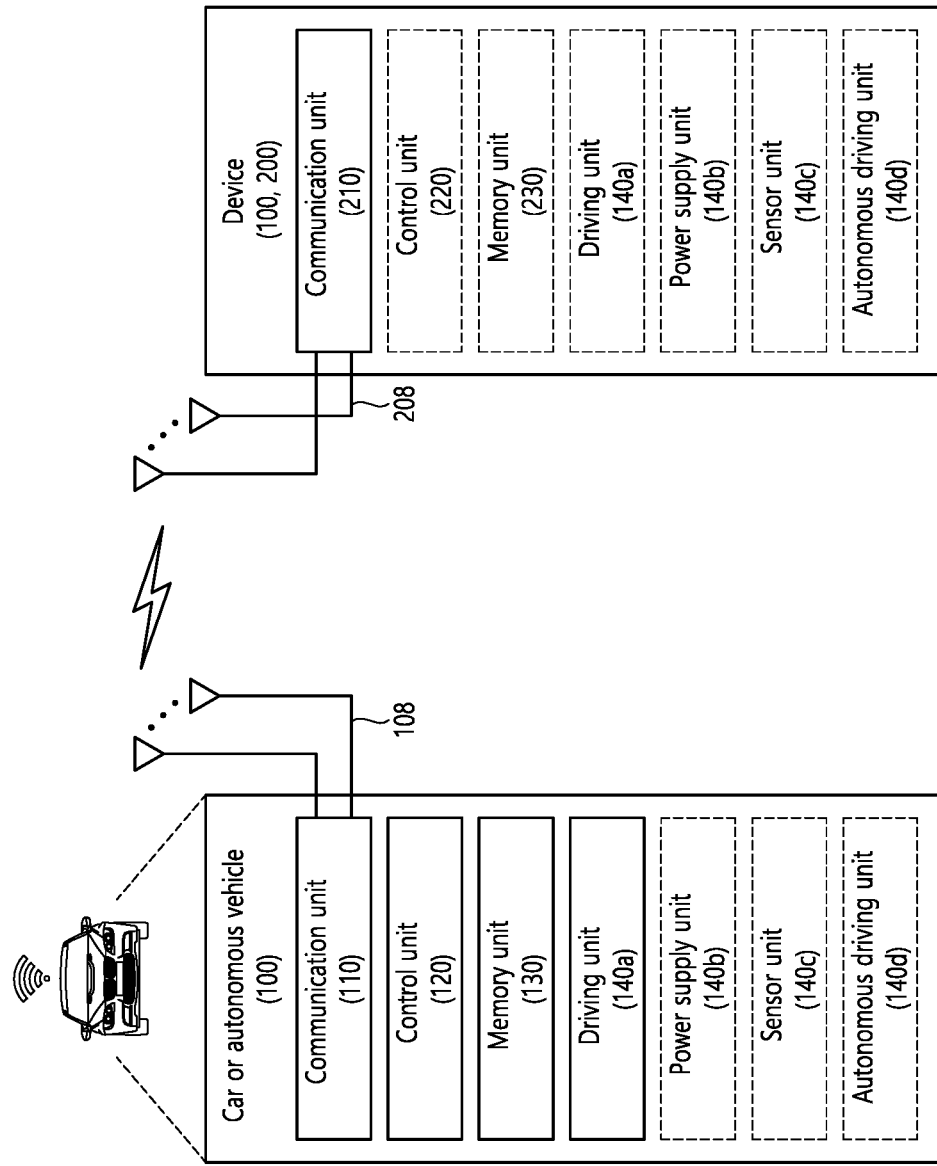
FIG. 29 shows a vehicle or an autonomous vehicle, in accordance with an embodiment of the present disclosure.

FIG. 29 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 29, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 27, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Figure 30:
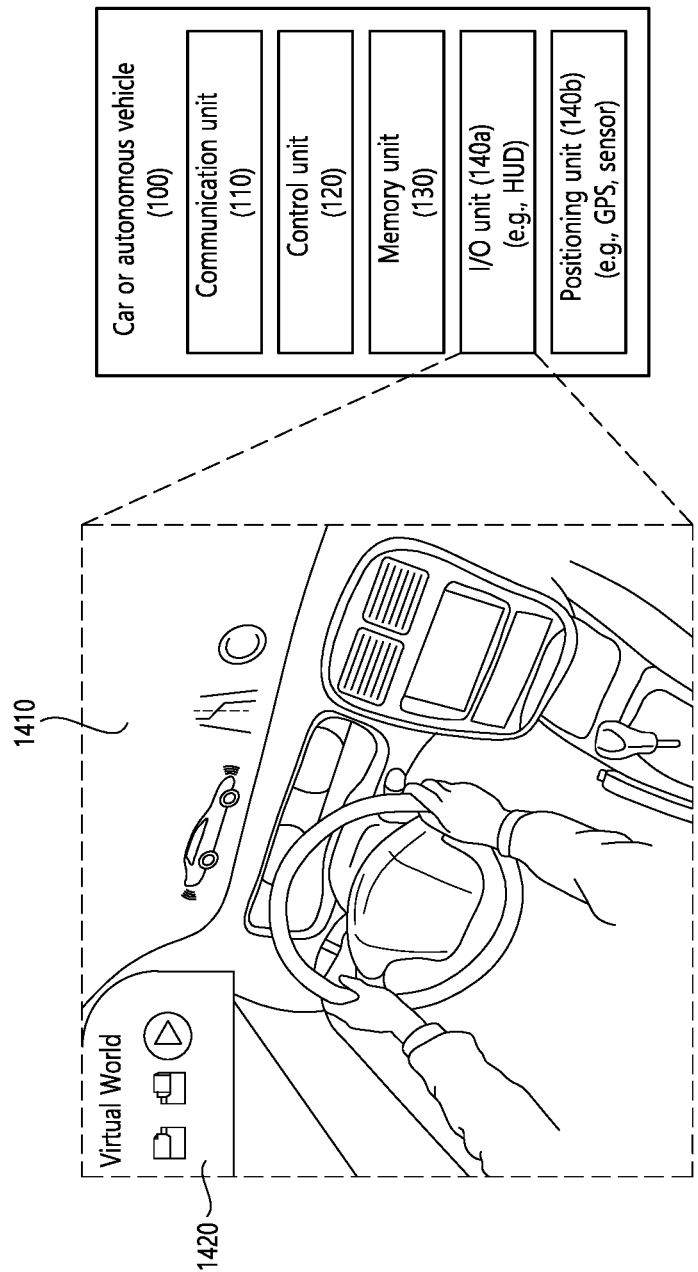
FIG. 30 shows a vehicle, in accordance with an embodiment of the present disclosure. The vehicle may be implemented as a transport means, an aerial vehicle, a ship, etc.

FIG. 30 shows a vehicle, in accordance with an embodiment of the present disclosure. The vehicle may be implemented as a transport means, an aerial vehicle, a ship, etc.

Referring to FIG. 30, a vehicle 100 may include a communication unit 110, a control unit 120, a memory unit 130, an I/O unit 140*a*, and a positioning unit 140*b*. Herein, the blocks 110 to 130/140*a* and 140*b* correspond to blocks 110 to 130/140 of FIG. 27.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140*a* may output an AR/VR object based on information within the memory unit 130. The I/O unit 140*a* may include an HUD. The positioning unit 140*b* may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Figure 31:
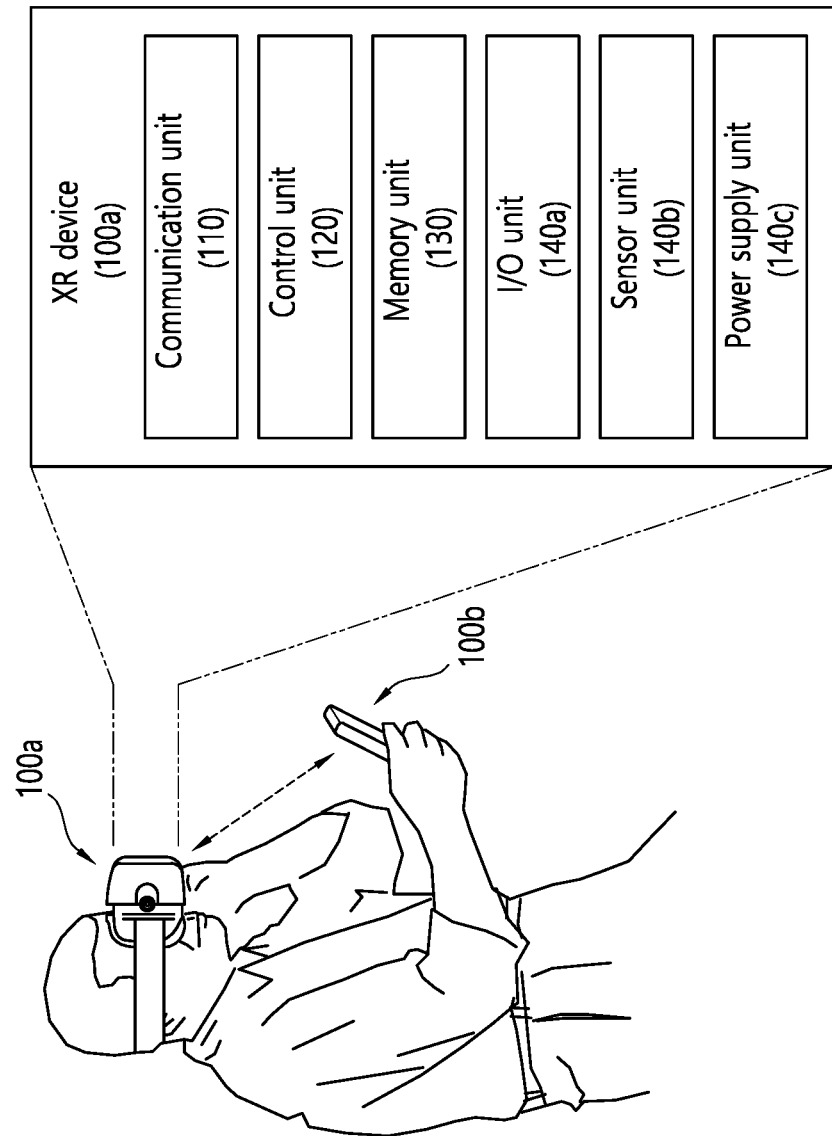
FIG. 31 shows an XR device, in accordance with an embodiment of the present disclosure.

FIG. 31 shows an XR device, in accordance with an embodiment of the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 31, an XR device 100*a* may include a communication unit 110, a control unit 120, a memory unit 130, an I/O unit 140*a*, a sensor unit 140*b*, and a power supply unit 140*c*. Herein, the blocks 110 to 130/140*a* to 140*c* correspond to the blocks 110 to 130/140 of FIG. 27, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100*b* and generate and output an XR object corresponding to the hand-held device 100*b*.

Figure 32:
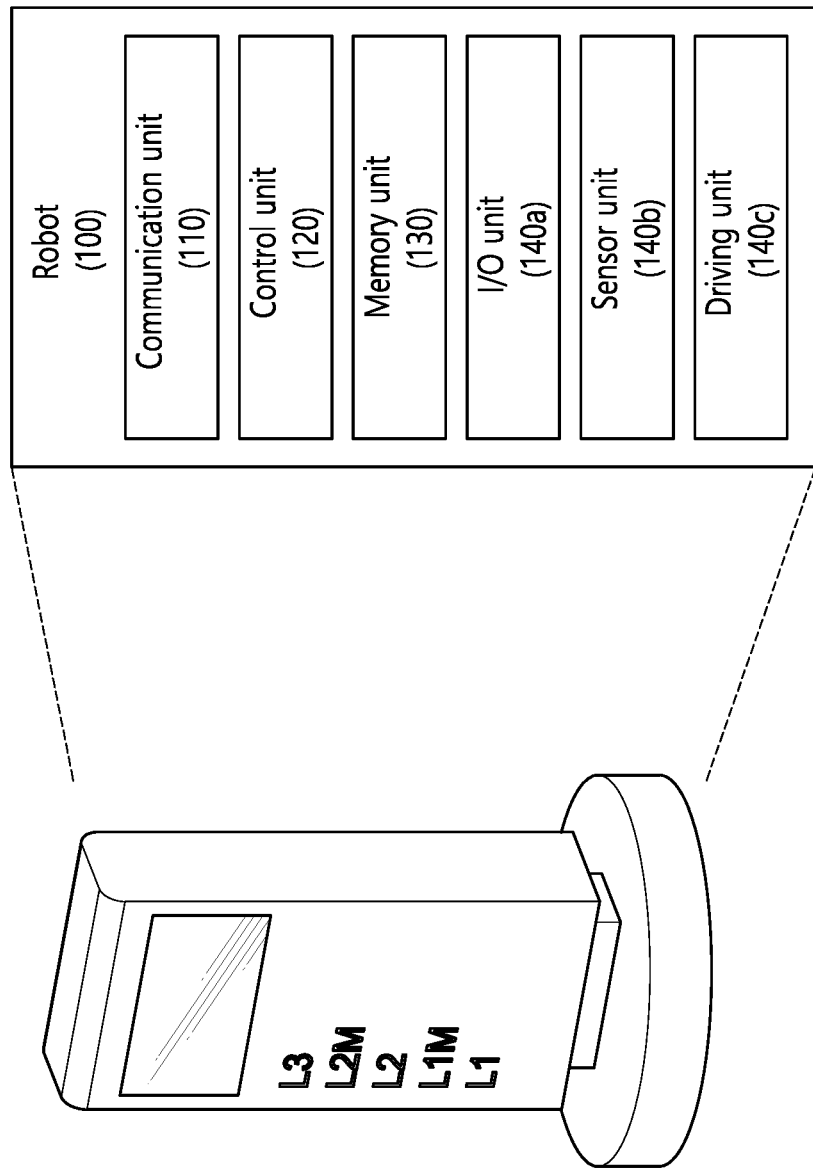
FIG. 32 shows a robot, in accordance with an embodiment of the present disclosure.

FIG. 32 shows a robot, in accordance with an embodiment of the present disclosure. The robot may be categorized into an industrial robot, a medical robot, a household robot, a military robot, etc., according to a used purpose or field.

Referring to FIG. 32, a robot 100 may include a communication unit 110, a control unit 120, a memory unit 130, an I/O unit 140*a*, a sensor unit 140*b*, and a driving unit 140*c*. Herein, the blocks 110 to 130/140*a* to 140*c* correspond to the blocks 110 to 130/140 of FIG. 27, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, etc.

Figure 33:
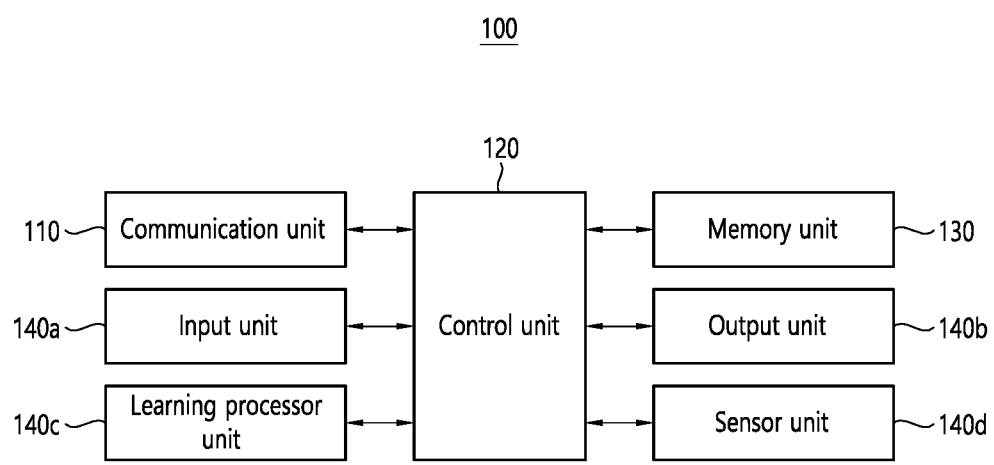
FIG. 33 shows an AI device, in accordance with an embodiment of the present disclosure.

FIG. 33 shows an AI device, in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 33, an AI device 100 may include a communication unit 110, a control unit 120, a memory unit 130, an I/O unit 140*a*/140*b*, a learning processor unit 140*c*, and a sensor unit 140*d*. The blocks 110 to 130/140*a* to 140*d* correspond to blocks 110 to 130/140 of FIG. 27, respectively.

The communication unit 110 may transmit and receive wired/radio signals (e.g., sensor information, user input, learning models, or control signals) to and from external devices such as other AI devices (e.g., 100*x*, 200, or 400 of FIG. 24) or an AI server (e.g., 400 of FIG. 24) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 24). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 24). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a first device in a wireless communication system, the method comprising:
    obtaining configuration information related to a hybrid automatic repeat request (HARQ);
    receiving, from a second device, first sidelink control information (SCI) for scheduling second SCI and a physical sidelink shared channel (PSSCH) on a physical sidelink control channel (PSCCH);
    receiving, from the second device, the second SCI on the PSSCH;
    transmitting, to the second device, a pre-emption message in a HARQ feedback resource based on the configuration information; and
    transmitting, to the second device, the pre-emption message in a PSCCH resource after the HARQ feedback resource,
    wherein the pre-emption message includes information related to a transmission of sidelink information by the first device.

2. The method of claim 1, wherein the sidelink information includes at least one of sidelink data or third SCI.

3. The method of claim 1, wherein the sidelink information includes at least one of sidelink information related to a high priority service, sidelink information related to a service requiring high reliability, or sidelink information related to a service requiring low latency.

4. The method of claim 1, wherein the information related to the transmission of the sidelink information by the first device includes at least one of priority information related to the sidelink information, information related to a proximity-based services (ProSe) per-packet priority (PPPP), information related to a ProSe per-packet reliability (PPPR), information related to a delay budget, information related to a modulation and coding scheme (MCS), information related to time resource pattern, information related to frequency resource pattern, information related to a HARQ process identifier (ID), information related to a source identity (ID), or information related to a destination identity (ID).

5. The method of claim 1, further comprising:
    transmitting, to the second device, the sidelink information on a resource to be used for the transmission of the sidelink information by the first device.

6. The method of claim 1, wherein an arrangement related to a resource used to transmit the pre-emption message is an arrangement in which a transmission resource is distributed based on a pre-determined interval in a frequency domain.

7. The method of claim 1, wherein whether all or part of a resource reserved by the second device overlap with a resource to be used for the transmission of the sidelink information by the first device is determined based on the pre-emption message.

8. A method for performing wireless communication by a second device, the method comprising:
    obtaining configuration information related to a hybrid automatic repeat request (HARQ);
    receiving, from a second device, first sidelink control information (SCI) for scheduling second SCI and a physical sidelink shared channel (PSSCH) on a physical sidelink control channel (PSCCH);
    receiving, from the second device, the second SCI on the PSSCH;
    transmitting, to the second device, a pre-emption message in a HARQ feedback resource based on the configuration information; and
    transmitting, to the second device, the pre-emption message in a PSCCH resource after the HARQ feedback resource,
    wherein the pre-emption message includes information related to a transmission of sidelink information by the first device.

9. The method of claim 8,
    wherein the sidelink information includes at least one of sidelink data or third SCI.

10. The method of claim 8, further comprising:
  determining whether to reselect all or part of a resource reserved by the second device based on the pre-emption message,
  wherein the determining whether to reselect the all or part of the resource reserved by the second device comprises:
  determining whether the all or part of the reserved resource overlap with a resource to be used for the transmission of the sidelink information by the first device.

11. The method of claim 10, further comprising:
  reselecting the all or part of the reserved resource based on that the all or part of the reserved resource overlap with the resource to be used for the transmission of the sidelink information by the first device,
  wherein a priority related to second sidelink information to be transmitted by the second device through the all or part of the reserved resource is lower than a priority related to the sidelink information.

12. The method of claim 8, wherein the sidelink information includes at least one of sidelink information related to a high priority service, sidelink information related to a service requiring high reliability, or sidelink information related to a service requiring low latency.

13. The method of claim 8, wherein the information related to the transmission of the sidelink information by the first device includes at least one of priority information related to the sidelink information, information related to a proximity-based services (ProSe) per-packet priority (PPPP), information related to a ProSe per-packet reliability (PPPR), information related to a delay budget, information related to a modulation and coding scheme (MCS), information related to time resource pattern, information related to frequency resource pattern, information related to a HARQ process identifier (ID), information related to a source identity (ID), or information related to a destination identity (ID).

14. A first device adapted to perform wireless communication, the first device comprising:
  at least one transceiver;
  at least one processor; and
  at least one memory connected to the at least one processor and storing instructions that, based on being executed, cause the first device to perform operations comprising:
  obtaining configuration information related to a hybrid automatic repeat request (HARQ);
  receiving, from a second device, first sidelink control information (SCI) for scheduling second SCI and a physical sidelink shared channel (PSSCH) on a physical sidelink control channel (PSCCH);
  receiving, from the second device, the second SCI on the PSSCH;
  transmitting, to the second device, a pre-emption message in a HARQ feedback resource based on the configuration information; and
  transmitting, to the second device, the pre-emption message in a PSCCH resource after the HARQ feedback resource,
  wherein the pre-emption message includes information related to a transmission of sidelink information by the first device.

* * * * *